US012370849B2

(12) United States Patent
Krajewski et al.

(10) Patent No.: US 12,370,849 B2
(45) Date of Patent: Jul. 29, 2025

(54) OUTDOOR POWER EQUIPMENT SUSPENSION SYSTEM

(71) Applicant: Briggs & Stratton LLC, Wauwatosa, WI (US)

(72) Inventors: Christopher Krajewski, West Allis, WI (US); Robert S. Laurin, Durhamville, NY (US); E. Mark Lynch, Munnsville, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/387,359

(22) Filed: Nov. 6, 2023

(65) Prior Publication Data
US 2024/0065148 A1 Feb. 29, 2024

Related U.S. Application Data

(63) Continuation of application No. 17/210,003, filed on Mar. 23, 2021, now Pat. No. 11,805,729, which is a
(Continued)

(51) Int. Cl.
B60G 3/20 (2006.01)
A01D 34/66 (2006.01)
(Continued)

(52) U.S. Cl.
CPC ........... B60G 3/202 (2013.01); A01D 34/662 (2013.01); A01D 34/82 (2013.01); A01D 67/00 (2013.01);
(Continued)

(58) Field of Classification Search
CPC .......... B60G 2300/084; B60G 2206/10; B60G 2204/129; B60G 2204/1242;
(Continued)

(56) References Cited

U.S. PATENT DOCUMENTS 2,756,045 A 7/1956 Savory
3,161,419 A * 12/1964 Schaaf ..................... B60G 3/26
280/5.521
(Continued)

FOREIGN PATENT DOCUMENTS

CA 2192224 A1 11/1997
CN 108473019 B * 7/2021 ........... B60G 21/023
(Continued)

OTHER PUBLICATIONS

Complaint filed on Mar. 20, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {TJM/ATB), United States District Court, Northern District of New York.
(Continued)

Primary Examiner — Arpad Fabian-Kovacs
(74) Attorney, Agent, or Firm — Foley & Lardner LLP

(57) ABSTRACT

A front independent suspension assembly for outdoor power equipment includes a first joint, a first wheel coupled to the joint, a first longitudinal arm pivotably coupled to the joint, a first lateral arm pivotably coupled to the joint, and a second lateral arm pivotably coupled to the joint. The second lateral suspension arranged substantially parallel to the first lateral suspension arm. The pivotal coupling between the joint and each of the first longitudinal arm, the first lateral arm, and the second lateral arm enables the first wheel to independently displace about a vertical axis.

20 Claims, 10 Drawing Sheets

Related U.S. Application Data continuation of application No. 16/859,713, filed on Apr. 27, 2020, now Pat. No. 10,959,373, which is a continuation of application No. 16/040,918, filed on Jul. 20, 2018, now Pat. No. 10,645,874, which is a continuation-in-part of application No. 15/861,939, filed on Jan. 4, 2018, now Pat. No. 10,624,261.

(60) Provisional application No. 62/442,171, filed on Jan. 4, 2017.

(51) Int. Cl.
*A01D 34/82* (2006.01)
*A01D 67/00* (2006.01)
*B60G 3/26* (2006.01)
*B60G 15/06* (2006.01)
*A01D 101/00* (2006.01)

(52) U.S. Cl.
CPC ............... *B60G 3/20* (2013.01); *B60G 3/26* (2013.01); *B60G 15/062* (2013.01); *A01D 34/66* (2013.01); *A01D 2101/00* (2013.01); *B60G 2200/1442* (2013.01); *B60G 2200/182* (2013.01); *B60G 2200/445* (2013.01); *B60G 2202/312* (2013.01); *B60G 2204/1242* (2013.01); *B60G 2204/129* (2013.01); *B60G 2206/10* (2013.01); *B60G 2300/084* (2013.01)

(58) Field of Classification Search
CPC ........ B60G 2202/312; B60G 2200/445; B60G 2200/182; B60G 2200/1442; B60G 15/062; B60G 3/26; B60G 3/202; B60G 3/20; A01D 2101/00; A01D 67/00; A01D 34/82; A01D 34/662; A01D 34/66
See application file for complete search history.

(56) References Cited

U.S. PATENT DOCUMENTS

| | | | |
|---|---|---|---|
| 3,719,371 A | 3/1973 | Musgrave | |
| 3,796,275 A | 3/1974 | Bouyer | |
| 3,876,226 A | 4/1975 | Cutler | |
| 3,940,161 A | 2/1976 | Allison | |
| 3,954,255 A | 5/1976 | Keijzer et al. | |
| 4,108,089 A | 8/1978 | Van Der Lely | |
| 4,132,121 A | 1/1979 | Clarke | |
| 4,159,128 A | 6/1979 | Blaine | |
| 4,256,292 A | 3/1981 | Sullivan et al. | |
| 4,343,138 A | 8/1982 | Neuerburg | |
| 4,416,109 A | 11/1983 | Slazas | |
| 4,449,602 A | 5/1984 | Dittmann, Jr. | |
| 4,577,712 A | 3/1986 | Foote et al. | |
| 4,592,439 A | 6/1986 | Collard et al. | |
| 4,657,271 A | 4/1987 | Salmon | |
| 4,809,796 A | 3/1989 | Yamaoka et al. | |
| 4,860,850 A | 8/1989 | Takahashi | |
| 4,962,636 A * | 10/1990 | Sampei | A01D 34/6806 74/521 |
| 4,969,533 A | 11/1990 | Holm et al. | |
| 5,042,238 A | 8/1991 | White et al. | |
| 5,065,568 A | 11/1991 | Braun et al. | |
| 5,090,512 A | 2/1992 | Mullet et al. | |
| 5,343,974 A | 9/1994 | Rabek | |
| 5,351,635 A | 10/1994 | Hulicsko | |
| 5,367,864 A | 11/1994 | Ogasawara et al. | |
| 5,381,647 A | 1/1995 | Eberle | |
| 5,487,535 A | 1/1996 | Carter et al. | |
| 5,536,135 A | 7/1996 | Robertson | |
| 5,706,907 A | 1/1998 | Unruh | |
| 5,765,846 A | 6/1998 | Braun | |
| 5,797,252 A * | 8/1998 | Goman | A01D 34/74 56/DIG. 14 |
| 5,873,224 A | 2/1999 | Murakawa et al. | |
| 5,874,593 A | 2/1999 | Ushio et al. | |
| 5,902,017 A | 5/1999 | Kurata et al. | |
| 5,946,893 A | 9/1999 | Gordon | |
| 5,996,982 A | 12/1999 | Bell | |
| 6,098,740 A | 8/2000 | Abend et al. | |
| 6,101,794 A | 8/2000 | Christopherson et al. | |
| 6,170,242 B1 | 1/2001 | Gordon | |
| 6,241,227 B1 | 6/2001 | Berdan et al. | |
| 6,244,025 B1 | 6/2001 | Ferris et al. | |
| 6,460,318 B1 | 10/2002 | Ferris et al. | |
| 6,510,678 B2 | 1/2003 | Ferris et al. | |
| 6,698,172 B2 | 3/2004 | Ferris et al. | |
| 6,711,885 B2 | 3/2004 | Ferris | |
| 6,830,115 B2 | 12/2004 | Okada et al. | |
| 6,857,254 B2 | 2/2005 | Melone et al. | |
| 6,874,308 B1 | 4/2005 | Bartel | |
| 6,874,593 B2 | 4/2005 | Abend et al. | |
| 6,902,017 B2 | 6/2005 | Ohashi | |
| 6,904,985 B2 | 6/2005 | Ferree et al. | |
| 6,912,832 B1 | 7/2005 | Thompson et al. | |
| 7,107,746 B2 | 9/2006 | Melone et al. | |
| 7,152,389 B2 | 12/2006 | Melone et al. | |
| 7,152,866 B2 | 12/2006 | Chalin et al. | |
| 7,373,871 B1 | 5/2008 | Buescher | |
| 7,374,187 B2 | 5/2008 | Melone et al. | |
| 7,380,805 B1 | 6/2008 | Turner | |
| 7,475,894 B2 | 1/2009 | Hodge | |
| 7,494,142 B2 | 2/2009 | Wolter | |
| 7,530,419 B2 | 5/2009 | Brudeli | |
| 7,546,723 B2 | 6/2009 | Melone et al. | |
| 7,592,439 B2 | 9/2009 | Ashkenazi et al. | |
| 7,600,769 B2 | 10/2009 | Bessho et al. | |
| 7,648,148 B1 | 1/2010 | Mercier | |
| 7,665,742 B2 | 2/2010 | Haerr et al. | |
| 7,694,769 B2 | 4/2010 | McGuire | |
| 7,708,292 B2 | 5/2010 | Foster | |
| 7,775,314 B2 | 8/2010 | Blais et al. | |
| 7,793,745 B2 | 9/2010 | Witt et al. | |
| 7,900,943 B2 | 3/2011 | Stewart | |
| 7,930,813 B2 | 4/2011 | Melone et al. | |
| 7,934,579 B2 | 5/2011 | Bowers | |
| 8,033,354 B2 | 10/2011 | Marshall et al. | |
| 8,065,864 B2 | 11/2011 | Melone et al. | |
| 8,132,822 B2 | 3/2012 | Nance | |
| 8,167,324 B2 | 5/2012 | Piontek | |
| 8,210,552 B2 | 7/2012 | Nance | |
| 8,322,736 B2 | 12/2012 | Bowers | |
| 8,397,367 B2 | 3/2013 | Melone et al. | |
| 8,398,101 B2 | 3/2013 | Alexander et al. | |
| 8,480,106 B1 | 7/2013 | Cohen | |
| 8,517,140 B2 | 8/2013 | West et al. | |
| 8,762,003 B2 | 6/2014 | Mercier | |
| 9,161,490 B2 | 10/2015 | Melone et al. | |
| 9,327,553 B2 | 5/2016 | Woodrum | |
| 9,481,242 B2 | 11/2016 | Melone et al. | |
| 9,597,957 B2 | 3/2017 | Weber et al. | |
| 9,707,842 B2 | 7/2017 | Melone et al. | |
| 9,848,776 B2 | 12/2017 | Proud | |
| 2002/0043422 A1 | 4/2002 | Suzuki | |
| 2002/0179341 A1 | 12/2002 | Boyer et al. | |
| 2003/0127266 A1 | 7/2003 | Kirkpatrick | |
| 2003/0221599 A1 | 12/2003 | Kinsella et al. | |
| 2004/0079063 A1 | 4/2004 | Ishimori | |
| 2006/0076747 A1* | 4/2006 | Pauls | A61G 5/1078 280/124.11 |
| 2007/0180805 A1 | 8/2007 | Melone et al. | |
| 2008/0012262 A1 | 1/2008 | Carabelli et al. | |
| 2008/0072556 A1* | 3/2008 | Tegtmeier | A01D 75/306 56/14.7 |
| 2008/0286168 A1 | 11/2008 | Raffaele | |
| 2008/0289168 A1 | 11/2008 | Melone et al. | |
| 2009/0127813 A1 | 5/2009 | Stewart | |
| 2009/0218781 A1 | 9/2009 | Sellars et al. | |
| 2011/0197419 A1* | 8/2011 | Melone | A01D 34/64 29/428 |
| 2013/0168934 A1* | 7/2013 | Krajekian | B62K 5/05 280/62 |
| 2014/0125091 A1 | 5/2014 | Aloy | |

(56) References Cited

U.S. PATENT DOCUMENTS

| | | | |
|---|---|---|---|
| 2014/0291951 A1* | 10/2014 | Zandbergen | B60G 7/008 280/79 |
| 2015/0078871 A1 | 3/2015 | Eavenson et al. | |
| 2016/0152262 A1 | 6/2016 | Laurin et al. | |
| 2016/0251051 A1 | 9/2016 | Malphettes | |
| 2017/0028844 A1 | 2/2017 | Melone et al. | |
| 2017/0113721 A1 | 4/2017 | Slegelis et al. | |
| 2017/0259666 A1 | 9/2017 | Weber et al. | |
| 2019/0030977 A1 | 1/2019 | Beylin et al. | |
| 2022/0324285 A1* | 10/2022 | Wilcox | B60G 3/20 |

FOREIGN PATENT DOCUMENTS

| | | | | |
|---|---|---|---|---|
| DE | 3714034 C1 * | 6/1988 | | B60G 3/20 |
| DE | 3730212 A1 * | 3/1989 | | B60G 3/26 |
| DE | 40 29 288 A1 | 9/1989 | | |
| DE | 3929390 A1 * | 3/1991 | | B60G 3/26 |
| DE | 10041200 A1 | 3/2002 | | |
| DE | 10207654 A1 * | 9/2003 | | B60G 3/20 |
| DE | 102007024586 A1 * | 11/2008 | | B60G 3/20 |
| DE | 10 2021 122 209 A1 | 4/2022 | | |
| EP | 589273 A1 * | 3/1994 | | B60G 3/205 |
| EP | 0924114 A2 * | 6/1999 | | B60G 3/26 |
| EP | 0934839 A2 * | 8/1999 | | B60G 3/202 |
| EP | 1 231 084 A2 | 8/2002 | | |
| EP | 1 495 662 A1 | 1/2005 | | |
| EP | 1995087 A2 * | 11/2008 | | B60G 3/20 |
| FR | 2898571 A1 * | 9/2007 | | B60G 21/007 |
| WO | WO-9405520 A1 * | 3/1994 | | B60G 11/14 |
| WO | WO-2014/132875 A1 | 9/2014 | | |
| WO | WO-2017/201439 A1 | 11/2017 | | |

OTHER PUBLICATIONS

Declaration of Clark J. Radcliffe in Support of Defendants' Motions for Summary Judgment filed on Jan. 7, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 95 pages.

Declaration of Jeffrey M. Olson in Support of Defendants' Motions for Summary Judgment of Invalidity filed on Jan. 7, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 306 pages.

Declaration of Jeffrey M. Olson in Support of Defendants' Opening Claim Construction Brief and Motion for Summary Judgment of Indefiniteness filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-SV-0316 {LEK/ATB), United States District Court, Northern District of New York, 212 pages.

Defendants' [Proposed] Amended L. Pal. R. 3.3-3.4 Disclosure of Non-Infringement and Invalidity Contentions mailed on Nov. 1, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 86 pages.

Defendants' [Proposed] Amended L. Pat. R. 3.3-3.4 Disclosure of Non-Infringement and Invalidity Contentions mailed on Nov. 1, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 86 pages.

Defendants' Amended L. Pal. R. 3.3-3.4 Disclosure of Non-Infringement and Invalidity Contentions mailed on Dec. 16, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 87 pages.

Defendants' Amended L. Pat. R. 3.3-3 .4 Disclosure of Non-Infringement and Invalidity Contentions mailed on Dec. 16, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 87 pages.

Defendants' Corrected Answer to Complaint and Defendant Denver Global Products, Inc.'s Counterclaims and Demand for Jury Trial filed on Jun. 12, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 LEK/ATB), United States District Court, Northern District of New York, 15 pages.

Defendants' L. Pal. R. 3.3-3.4 Disclosure of Non-Infringement and Invalidity Contentions mailed on Oct. 21, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 78 pages.

Defendants' L. Pat. R. 3.3-3.4 Disclosure of Non-Infringement and Invalidity Contentions mailed on Oct. 21, 2013 n *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 78 pages.

Defendants' Opening Claim Construction Brief filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 30 pages.

Defendants' Preliminary Proposed Constructions and Preliminary Identification of Intrinsic and Extrinsic Evidence mailed on Nov. 27, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 40 pages.

Defendants' Responsive Claim Construction Brief filed on Mar. 3, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 29 pages.

Expert Declaration of Clark J. Radcliffe regarding Claim Term Definitions for Construction filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 38 pages.

Expert Declaration of Timothy M. Hicks in Response to Defendants' Expert Declaration by Clark J. Radcliffe, PhD mailed on Dec. 23, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 9 pages.

Expert Declaration of Timothy M. Hicks Regarding U.S. Pat. No. 7,107,746 filed on Feb. 18, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 3 pages.

Information about Related Patents and Patent Applications, see section 6 of the accompanying Information Disclosure Statement Letter, which concerns Related Patents and Patent Applications.

Joint Statement Pursuant to Local Patent Rule 4.7 filed on Mar. 17, 2014 in *Briggs & Stratton Corporation, Briggs & Stratton Power*

(56) References Cited

OTHER PUBLICATIONS

*Products Group, LLC* v. *Chongqing RATO Power Co., Ltd; RATO North America; Denver Global Products, Inc.*, 5:13-CV-0316 {LEK/ATB), United States District Court, Northern District of New York, 5 pages.
Letter Brief to Court regarding significant recent authority relating to Denver Global Products, Inc.'s pending Motion for Summary Judgement of Invalidity for Indefiniteness filed on Jun. 3, 2014 *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 20 pages.
Letter Brief to Court regarding significant recent authority relating to the parties' claim construction briefing and Denver Global Products, Inc.'s pending Motion for Summary Judgement of Invalidity for Indefiniteness filed on Sep. 15, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 17 pages.
Letter to Court addressing statements in Brigg's letter request filed on Feb. 21, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 2 pages.
Memorandum of Law in Support of Defendants' Motion for Summary Judgment of Invalidity of U.S. Pat. No. 7,107,746 filed on Jan. 7, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 19 pages.
Memorandum of Law in Support of Defendants' Motion for Summary Judgment of Invalidity of U.S. Pat. No. 6,510,678 filed on Jan. 7, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 27 pages.
Memorandum of Law in Support of Defendants' Notice of Motion for Summary Judgment of Invalidity for Indefiniteness filed on Jan. 30, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 10 pages.
Memorandum-Decision and Order filed on Jul. 30, 2015 in *Briggs & Stratton Corporation, Briggs & Stratton Power Products Group, LLC* v. *Chongqing RATO Power Co., Ltd; RATO North America; Denver Global Products, Inc.*, 5:13-31/-0316 {LEK/ATB), United States District Court, Northern District of New York, 18 pages.
Memorandum-Decision and Order filed on Jul. 30, 2015 n *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATB), United States District Court, Northern District of New York, 18 pages.
Memorandum-Decision and Order filed on Sep. 30, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATB), United States District Court, Northern District of New York, 40 pages.
Memorandum-Decision and Order filed on Sep. 30, 2014 in *Briggs & Stratton Corporation, Briggs & Stratton Power Products Group, LLC* v. *Chongqing RATO Power Co., Ltd; RATO North America; Denver Global Products, Inc.*, J:13-CV-0316 {LEK/ATB), United States District Court, Northern District of New York, 40 pages.
Plaintiffs' Disclosure of Asserted Claims and Infringement Contentions Pursuant to Local Patent Rules 3.1 and 3.2 mailed on Sep. 19, 2013 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 28 pages.
Plaintiffs' Disclosure of Asserted Claims and Infringement Contentions Pursuant to Local Patent Rules 3.1 and 3.2 mailed on Sep. 19, 2013 in *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATS), United States District Court, Northern District of New York, 28 pages.
Plaintiffs' Opening Claim Construction Brief filed on Jan. 30, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 32 pages.
Plaintiffs' Opposition to Defendants' Motion for Summary Judgement of Invalidity for Indefiniteness filed on Feb. 18, 2014 i *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 33 pages.
Plaintiffs' Opposition to Defendants' Motion for Summary Judgement of Invalidity for Indefiniteness filed on Feb. 8, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATB), United States District Court, Northern District of New York, 33 pages.
Plaintiffs' Opposition to Defendants' Motion for Summary Judgment of Invalidity of U.S. Pat. No. 6,510,678 filed on Jan. 30, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 31 pages.
Plaintiffs' Opposition to Defendants' Motion for Summary Judgment of Invalidity of U.S. Pat. No. 7,107,746 filed on Jan. 30, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 32 pages.
Plaintiffs' Proposed Constructions and Identification of Intrinsic and Extrinsic Evidence mailed on Nov. 27, 2013 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 78 pages.
Plaintiffs' Rebuttal Claim Construction Brief filed on Mar. 3, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 33 pages.
Plaintiffs' Responses and Objections to Rata's First Set of Interrogatories [Nos. 1-10] mailed Oct. 9, 2013 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 61 pages.
Plaintiffs' Responses and Objections to Rata's Second Set of Interrogatories [No. 11] mailed on Jan. 15, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 {LEK/ATB), United States District Court, Northern District of New York, 6 pages.
Plaintiffs-Counterdefendants' Answer to Corrected Counterclaims filed on Jul. 5, 2013 in *Briggs & Stratton Corporation, Briggs & Stratton Power Products Group, LLC* v. *Chongqing RATO Power*

(56) References Cited

OTHER PUBLICATIONS

*Co., Ltd; RATO North America; Denver Global Products, Inc.*, 5:13-CV-0316 {LEK/ATB), United States District Court, Northern District of New York, 9 pages.

Replacement Exhibit 11 to Olson Declaration filed on Jan. 8, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 3 pages.

Reply Brief in Support of Defendants' Motion for Summary Judgment of Invalidity for Indefiniteness filed on Feb. 24, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 15 pages.

Reply Brief in Support of Defendants' Motion for Summary Judgment of Invalidity for Indefiniteness filed on Feb. 4, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 15 pages.

Reply Brief in Support of Defendants' Motion for Summary Judgment of Invalidity of U.S. Pat. No. 6,510,678 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 14 pages.

Reply Brief in Support of Defendants' Motion for Summary Judgment of Invalidity of U.S. Pat. No. 7,107,746 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 14 pages.

Supplemental Declaration of Jeffrey M. Olson in Support of Defendants' Motion for Summary Judgment of Invalidity filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 6 pages.

The Parties' Joint Claim Construction Statement Pursuant to Local Patent Rule 4.4 filed on Dec. 16, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 {LEK/ATB), United States District Court, Northern District of New York, 9 pages.

\* cited by examiner

OUTDOOR POWER EQUIPMENT SUSPENSION SYSTEM

CROSS-REFERENCE TO RELATED PATENT APPLICATIONS

This application is a continuation of U.S. patent application Ser. No. 17/210,003, filed on Mar. 23, 2021, which is a continuation of U.S. patent application Ser. No. 16/859,713, filed Apr. 27, 2020, which is a continuation of U.S. patent application Ser. No. 16/040,918, filed Jul. 20, 2018, which is a continuation-in-part of U.S. patent application Ser. No. 15/861,939, filed Jan. 4, 2018, which claims priority to U.S. Provisional Patent Application No. 62/442,171, filed Jan. 4, 2017, all of which are incorporated herein by reference in their entireties.

BACKGROUND

Lawn mowers, particularly self-propelled machines fitted with rotating blades for cutting grass and other vegetation, can produce uneven cuts and transmit unwanted stresses from the terrain to the driver and mower, resulting in driver fatigue and discomfort, mower wear and tear, more frequent repairs, and a shorter mower life. In many typical mowers, the cutter deck is suspended as either a ground-following deck or a floating deck. A ground-following deck typically rides on caster wheels (e.g., a set of two or four caster wheels in many cases) and follows the contours of the ground. A floating deck is often suspended beneath the frame between the front and rear wheels, such as by chains, sets of links and other elements. Other floating decks are suspended in various manners over the ground at a location in front of, behind, or beside the lawn mower frame. The floating deck is raised when skids, wheels, rollers, or other elements attached to the deck contact the lawn surface. The height of a floating deck from the surface being cut is often defined at least in part by the elevation of the mower's frame.

Generally, the intent for such a deck suspension system is to avoid continuing contact with the earth surface. When a cutter deck travels over uneven terrain having a strong grade, the cutter deck can contact the earth surface, and can cause the lawnmower blade(s) therein to scalp the surface being cut. Cutter decks are generally designed to avoid scalping by rising or floating upwardly. This generally works for certain kinds of earth unevenness, but some scalping still occurs on severe terrain. Even if scalping can be avoided, cutter deck height relative to the earth surface can vary widely. This is also undesirable because it results in an unequal height of the cut grass.

A significant number of lawnmowers have wheels that are rigidly attached to the mower frame. Unfortunately, when a mower having such a suspension encounters uneven terrain, the mower frame can respond with significant upward and downward movement. With regard to lawnmower front wheels, many conventional lawn mower designs either rigidly connect the front wheels to the frame as just mentioned or employ a single axle to which the front wheels are attached. In some cases, the single axle can pivot about a point between the wheels, thereby generating slightly improved performance. Whether rigidly secured to the frame or connected to a common axle, such front suspension designs either do not eliminate the undesirable upward and downward frame movement described above, or only do so to a very limited extent. For example, if one wheel of such a mower rises in response to a rise in terrain, the single axle would cease to be parallel with the earth surface, generating forces that bring the frame and cutter deck also out of a parallel relationship with the earth surface. The resulting cut of the grass is uneven and unsatisfactory.

In these and other conventional mowers, improved spring suspension systems are employed to reduce the amount of vertical frame motion when one or more wheels encounter unevenness in the earth surface being traversed. These spring systems improve traction of such mowers by maintaining improved contact between the wheels and the surface being traversed. However, these spring suspension systems can cause or allow the frame to roll relative to the cutting surface, such as, for example, when a mower is turned sharply or navigates a steep hillside. When a frame rolls, a floating cutter deck (and in many cases, even a ground-following cutter deck) rolls with the frame, resulting in one side of the cutter deck being closer to the cutting surface than the other. Consequentially, the cut of the grass is uneven and unsatisfactory.

In some conventional mowers, caster wheels are suspended on linkages which change the camber of the wheels throughout the travel of the linkages. Such suspension designs typically allow the caster wheels to wobble like the wheels on a shopping cart, decreasing mower stability and increasing the likelihood of turf damage.

In order to address cutting quality, rider comfort, and suspension wear problems, many conventional lawn mowers employ suspensions having one or more springs. Although such spring suspensions do represent an improvement and can help to address these problems, significant room for improvement still exists. For example, heavy riders or heavy mower accessories (e.g., grass catchers) tend to exert extra stress on the suspension springs, potentially causing the suspension springs to "bottom out" or to provide a limited range of spring motion. In either case, an uncomfortable ride results because the spring has limited or no capacity to absorb shock. As a result, an increased amount of shock is transferred to the mower and operator. The increase in shock can significantly shorten the life of the mower and can be a cause of more frequent mower maintenance and repair. Substituting a stiffer spring for heavy loading situations is an unattractive solution for many reasons, such as an uncomfortable ride in a light loading situation and additional low-level vibrations transmitted to the frame.

In light of the shortcomings and problems of conventional lawn mowers described above, a need exists for a lawn mower having a suspension system that improves ride quality in a light loading situation, provides improved steering control and traction, while maintaining improved contact between the wheels and the surface being traversed, as well as improved floating cutter deck and/or ground-following cutter deck motion.

SUMMARY

At least one embodiment relates to an outdoor power equipment unit including an independent suspension system. The independent suspension system includes a frame, a first wheel assembly, a second wheel assembly, a first laterally-extending suspension arm pair, and a second laterally-extending suspension arm pair. The frame includes an end structural member, a first side structural member, and a second side structural member with each of the first side structural member and the second side structural member being located on opposite respective sides of the end structural member. The first wheel assembly includes a first wheel and a first side suspension arm. The first side suspension arm is pivotably coupled at a first end to the first side structural member and is fixedly coupled at a second opposite end to a joint of the first wheel assembly The second wheel assembly includes a second wheel and a second side suspension arm. The second side suspension arm is pivotably coupled at a first end to the second side structural member and is fixedly coupled at a second opposite end to a joint of the second wheel assembly. The first laterally-extending suspension arm pair includes a first suspension arm pivotally coupled at a first end to the frame and pivotally coupled at a second end to the joint of the first wheel assembly and a second suspension arm arranged substantially parallel to the first suspension arm and pivotally coupled at a first end to the frame and pivotally coupled at a second end to the joint of the first wheel assembly. The second laterally-extending suspension arm pair includes a third suspension arm pivotally coupled at a first end to the frame and pivotally coupled at a second end to the joint of the second wheel assembly and a fourth suspension arm arranged substantially parallel to the third suspension arm and pivotally coupled at a first end to the frame and pivotally coupled at a second end to the joint of the second wheel assembly. Both the first laterally-extending suspension arm pair and the second laterally-extending suspension arm pair are configured to independently pivot about the frame such that each of the first wheel assembly and the second wheel assembly are vertically displaceable relative to the frame.

Another embodiment relates to an independent suspension system for outdoor power equipment including a frame, a first wheel assembly, a second wheel assembly, a first suspension arm pair, and a second suspension arm pair. The frame includes an end structural member, a first side structural member, and a second side structural member with each of the first side structural member and the second side structural member being located on opposite respective sides of the end structural member. The first wheel assembly includes a first wheel and a first side suspension arm. The second wheel assembly includes a second wheel and a second side suspension arm. The first suspension arm pair includes a first suspension arm and a second suspension arm. The first suspension arm is pivotably coupled at one end to the end structural member and at another, opposite end to the first wheel assembly, and the second suspension arm is pivotably coupled at one end to the end structural member and at another, opposite end to the first wheel assembly such that the second suspension arm is vertically offset from the first suspension arm. The second suspension arm pair includes a third suspension arm and a fourth suspension arm. The third suspension arm is pivotably coupled at one end to the end structural member and at another, opposite end to the second wheel assembly, and wherein the fourth suspension arm is pivotably coupled at one end to the end structural member and at another, opposite end to the second wheel assembly such that the fourth suspension arm is vertically offset from the third suspension arm. The first side suspension arm is pivotably coupled at one end to the first side structural member. The second side suspension arm is pivotably coupled at one end to the second side structural member.

Another embodiment relates to a mower including a cutter deck including multiple mower blades and an independent suspension system. The independent suspension system includes a frame, a first wheel assembly, a second wheel assembly, a first laterally-extending suspension arm pair, and a second laterally-extending suspension arm pair. The frame includes an end structural member, a first side structural member, and a second side structural member with each of the first side structural member and the second side structural member being located on opposite respective sides of the end structural member. The first wheel assembly includes a first wheel and a first side suspension arm. The first side suspension arm is pivotably coupled at a first end to the first side structural member and is fixedly coupled at a second opposite end to a joint of the first wheel assembly The second wheel assembly includes a second wheel and a second side suspension arm. The second side suspension arm is pivotably coupled at a first end to the second side structural member and is fixedly coupled at a second opposite end to a joint of the second wheel assembly. The first laterally-extending suspension arm pair includes a first suspension arm pivotally coupled at a first end to the frame and pivotally coupled at a second end to the joint of the first wheel assembly and a second suspension arm arranged substantially parallel to the first suspension arm and pivotally coupled at a first end to the frame and pivotally coupled at a second end to the joint of the first wheel assembly. The second laterally-extending suspension arm pair includes a third suspension arm pivotally coupled at a first end to the frame and pivotally coupled at a second end to the joint of the second wheel assembly and a fourth suspension arm arranged substantially parallel to the third suspension arm and pivotally coupled at a first end to the frame and pivotally coupled at a second end to the joint of the second wheel assembly. Both the first laterally-extending suspension arm pair and the second laterally-extending suspension arm pair are configured to independently pivot about the frame such that each of the first wheel assembly and the second wheel assembly are vertically displaceable relative to the frame.

DETAILED DESCRIPTION

Figure 1:
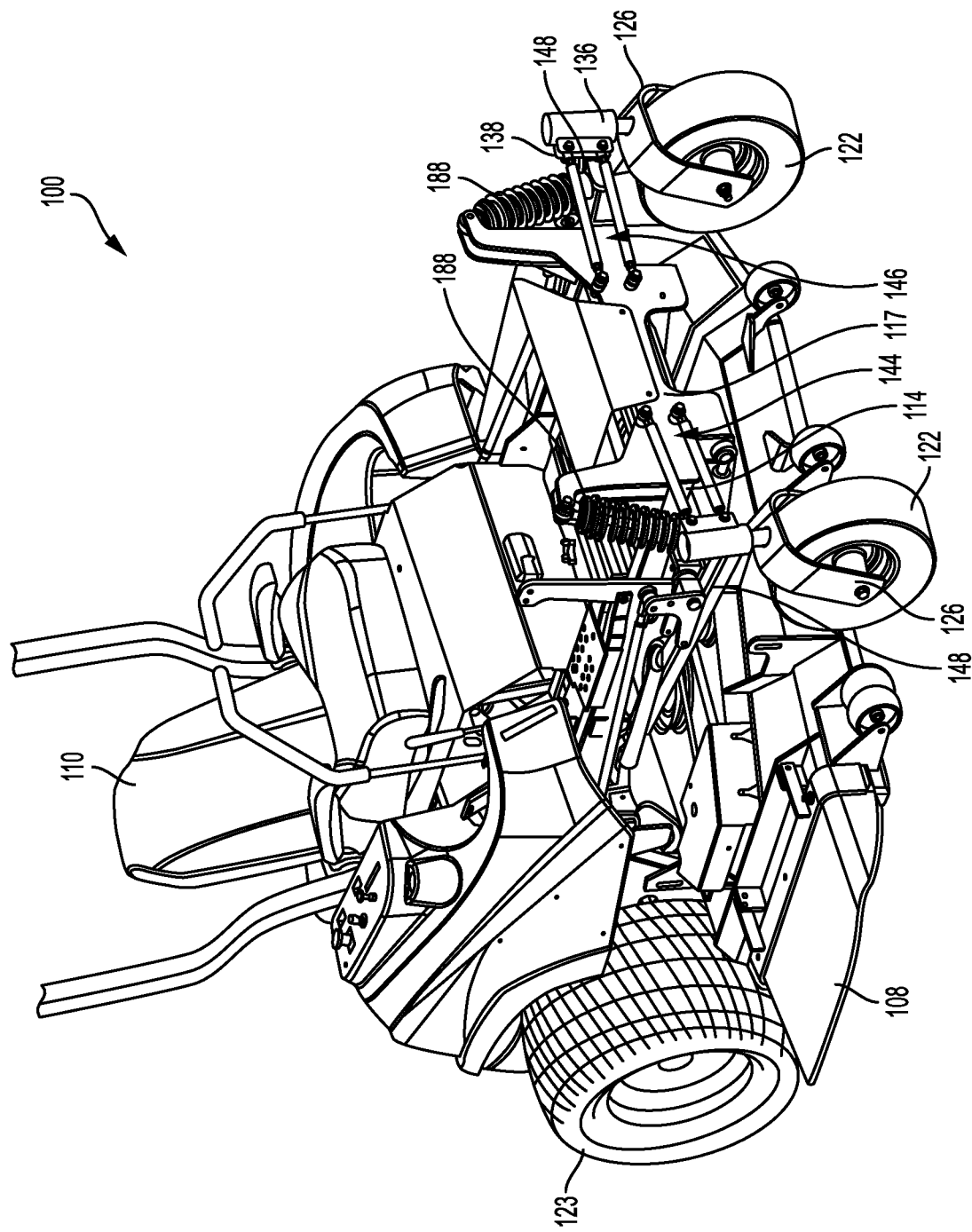
FIG. 1 illustrates a front perspective view of a ride-on mower including a 4-bar linkage front suspension arrangement in accordance with an aspect of the disclosure.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives that fall within the scope of embodiments of the disclosure.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a mower is oriented as shown in the figures.

Although the mowers of some embodiments of the disclosure can be equipped with either a ground-following cutter deck or a floating cutter deck, using a floating cutter deck with a mower having independent suspension requires additional considerations. Rolling of a lawn mower chassis is induced under certain situations. Among them are: (a) when the mower changes direction while traveling forward and centrifugal force acts laterally at the center of gravity of the machine; (b) when the mower traverses a slope and the gravitational force vector shifts direction relative to the plane of the mower wheel tread, and (c) when the mower travels over a surface undulation, lifting or lowering one or both wheels on one side, thereby rotating the mower chassis in space. Conventional mowers typically use wheels that are rigidly connected to the chassis. In these mowers, the chassis cannot roll relative to the wheels; therefore, there is no rolling of types (a) and (b). Other conventional mowers have a pivoting front or rear axle at one end, with an opposing end axle rigidly attached to the chassis. In these mowers, the rigidly attached axle limits the chassis roll which the pivoting axle otherwise permits to the extent the chassis is sufficiently rigid. The mower of some embodiments of the disclosure can include both front and rear independent wheel suspension systems, beneficially minimizing rolling of the machine when a wheel passes over certain small bumps and depressions-type (c) rolling.

Figure 2:
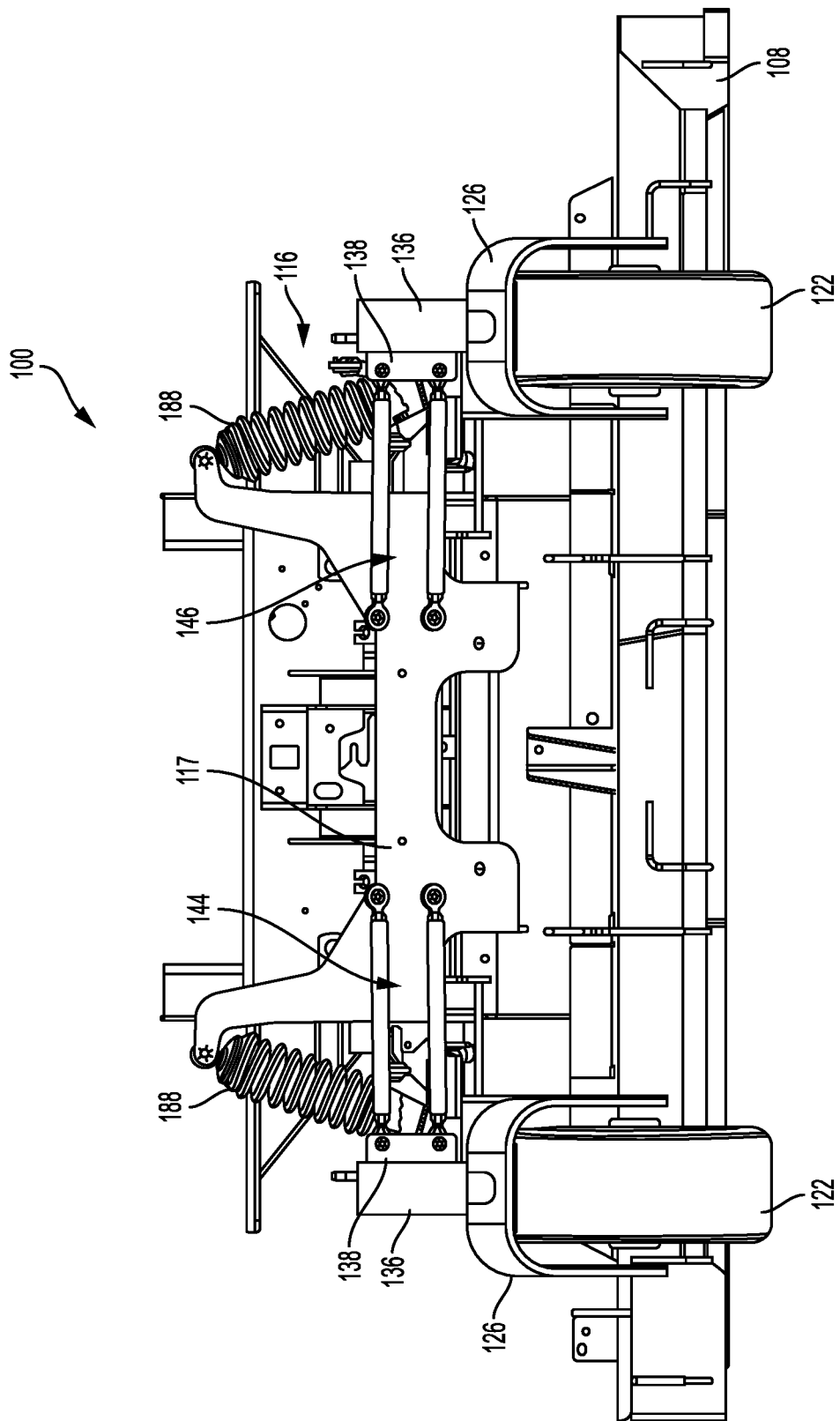
FIG. 2 illustrates a front view of a ride-on mower including a 4-bar linkage front suspension arrangement in accordance with an aspect of the disclosure.
Figure 3:
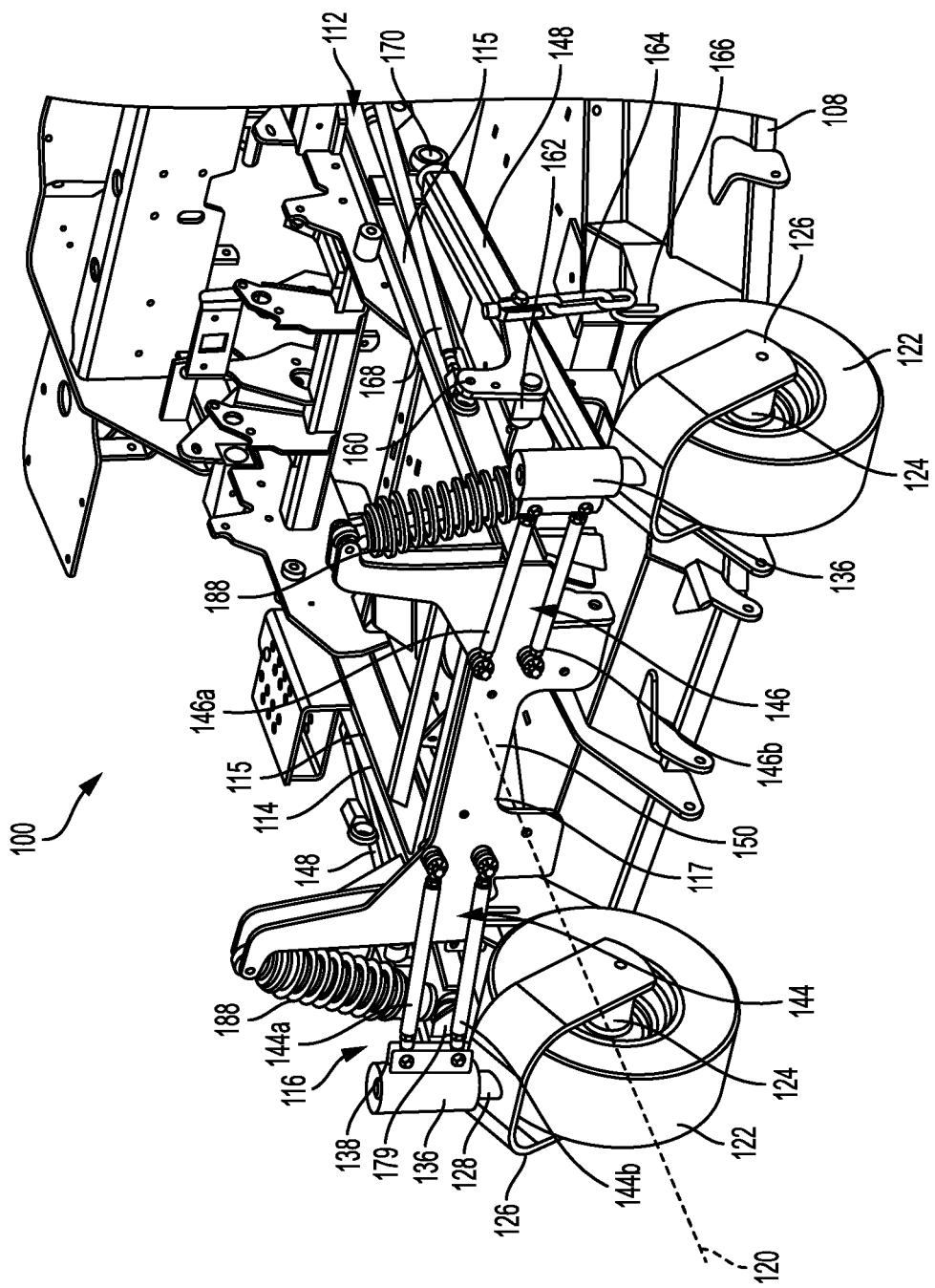
FIG. 3 illustrates a front perspective view of a portion of a ride-on mower including a 4-bar linkage front suspension arrangement in accordance with an aspect of the disclosure.
Figure 4:
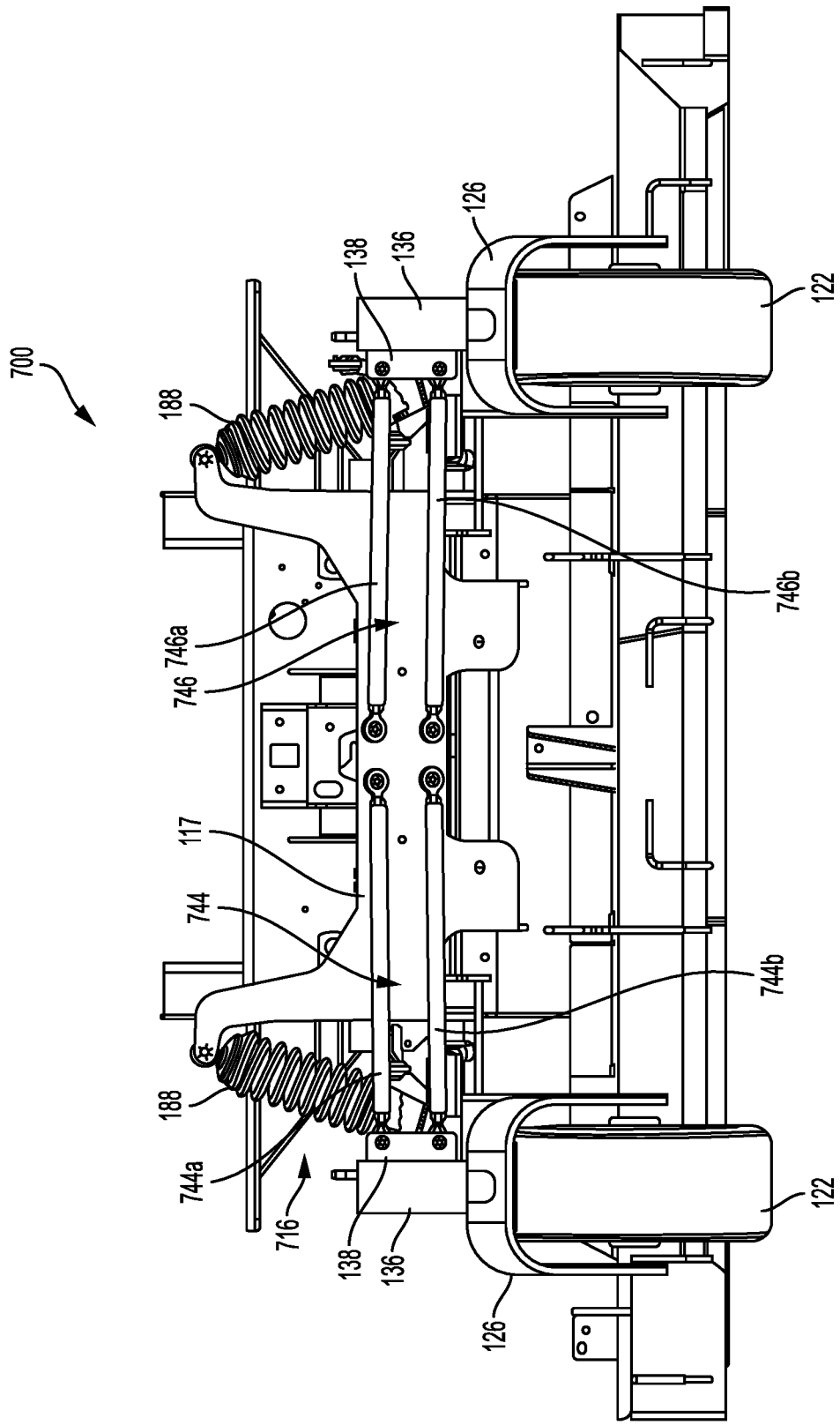
FIG. 4 illustrates a front view of a ride-on mower including a 4-bar linkage front suspension arrangement in accordance with another aspect of the disclosure.
Figure 5:
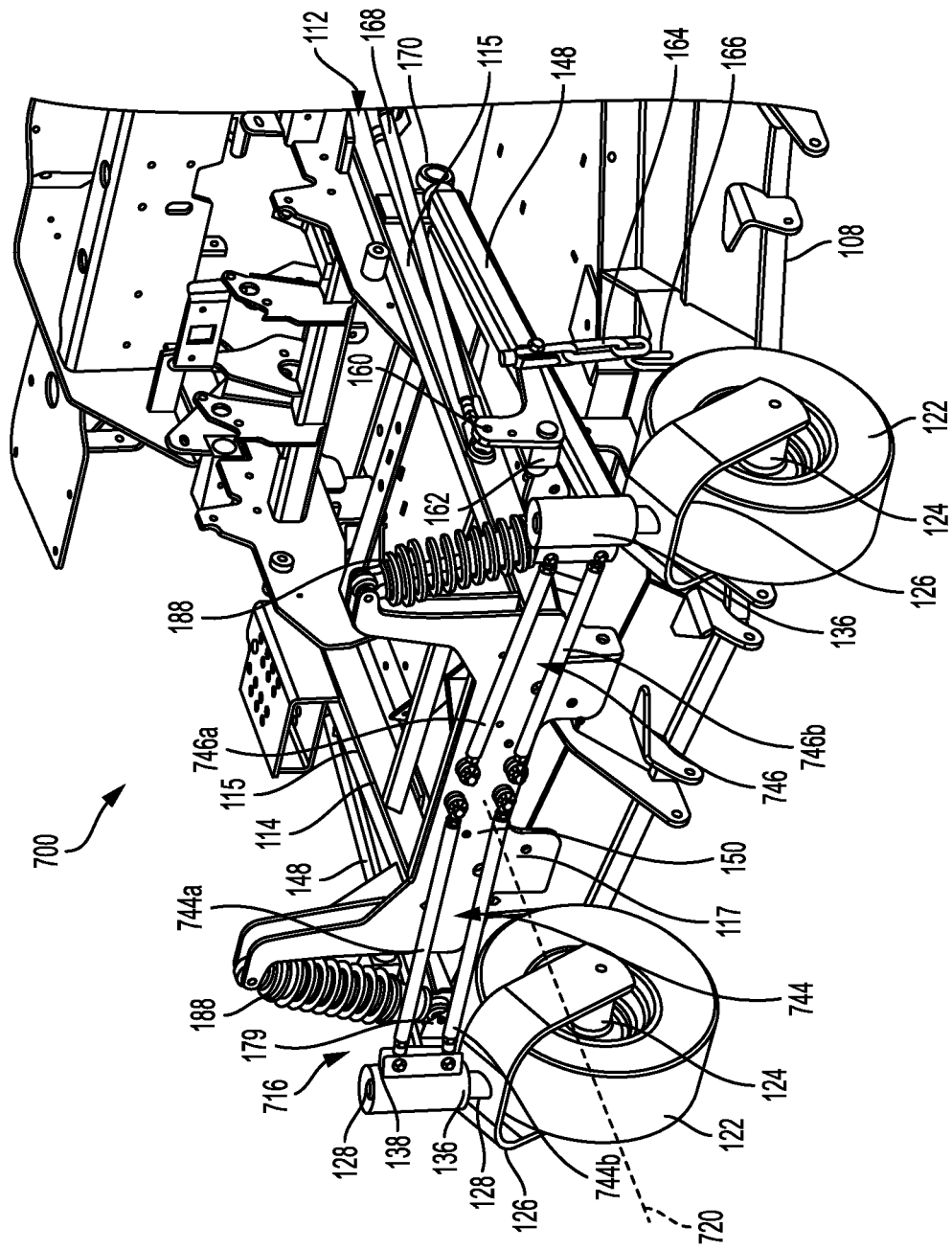
FIG. 5 illustrates a front perspective view of the ride-on mower of FIG. 4 in accordance with an aspect of the disclosure.
Figure 6:
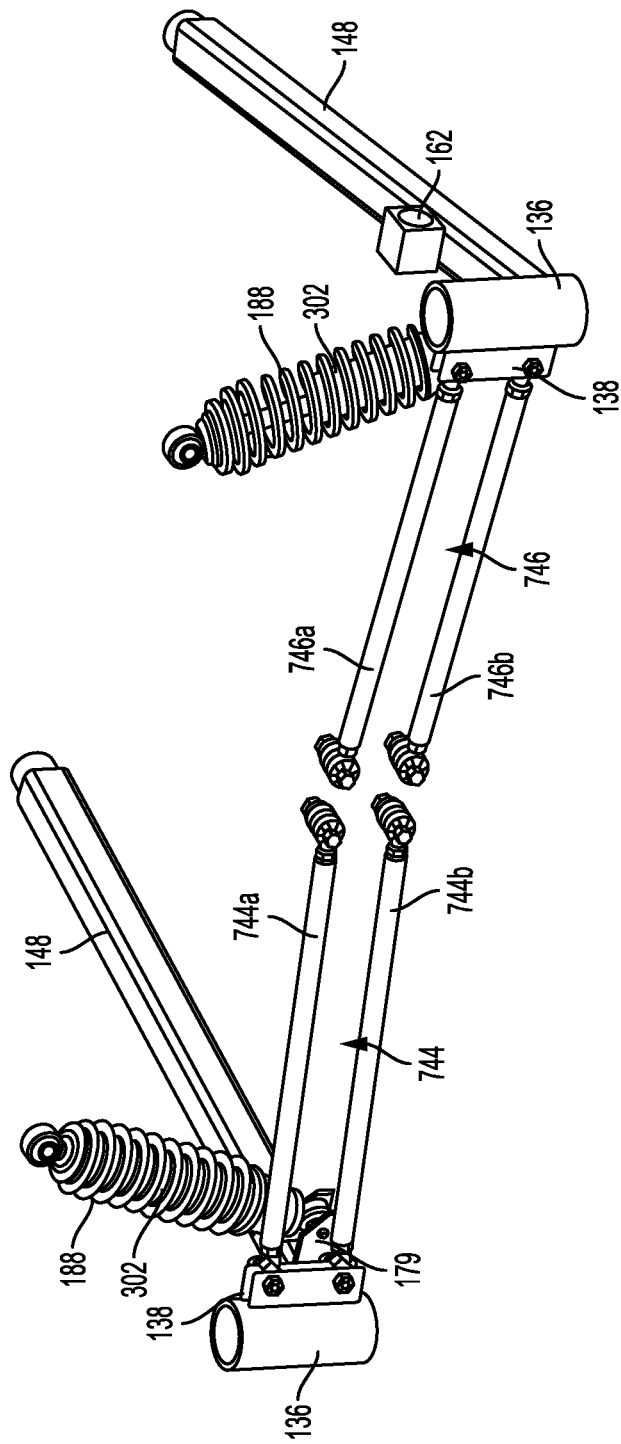
FIG. 6 illustrates a perspective view of a portion of a suspension assembly with 4-bar linkage in accordance with an aspect of the disclosure.

FIGS. 1-3 illustrate an embodiment of the disclosure related to ride-on mower 100 having a ground-following deck. FIG. 1 illustrates a front perspective view of a portion of a ride-on mower 100 including a 4-bar linkage suspension assembly in accordance with some embodiments of the disclosure. FIG. 2 illustrates a front view of a ride-on mower 100 including a 4-bar linkage suspension assembly in accordance with some embodiments of the disclosure. FIG. 3 illustrates a front perspective view of a portion of a ride-on mower 100 including a 4-bar linkage suspension assembly in accordance with some embodiments of the disclosure. FIGS. 4-5 illustrate an embodiment of the disclosure related to ride-on mower 700. The mower 700 can comprise all of the components and structure of the mower 100 with an alternative 4-bar linkage suspension assembly. For example, FIG. 4 illustrates a front view of a ride-on mower 700 including a 4-bar linkage suspension assembly in accordance with another embodiment of the disclosure. FIG. 5 illustrates a front perspective view of the ride-on mower 700 of FIG. 4 in accordance with some embodiments of the disclosure. Further, the 4-bar linkage suspension assembly shown in FIGS. 4-5 is shown in FIG. 6 which illustrates a perspective view of a portion of a suspension assembly with 4-bar linkage in accordance with some embodiments of the disclosure. Other than the alternative 4-bar linkage embodiments of ride-on mower 100 and ride-on mower 700 described above, the following discussion of other components, structures, assemblies, and operating functions and characteristics can be considered equivalent between the ride-on mowers 100, 700.

In some embodiments of the disclosure, the ride-on mower 100 illustrated in FIGS. 1-3 and the ride-on mower 700 shown in FIGS. 4-5 can include a motor and a motor cover (not shown), a chassis 112, a front frame 114, a pair of front wheel assemblies 122, a pair of rear wheels 123, a cutter deck 108, a seat 110, and a pair of front wheel independent suspension assemblies 116. The particular type of ride-on mowers 100, 700 illustrated in FIGS. 1-5 are presented by way of example only. In this regard, the suspension systems of some embodiments of the disclosure can be employed on any type of riding or non-riding lawn mower and the illustrations and accompanying descriptions presented herein should not be limited by any one or more features, components, assemblies, or functions of the ride-on mowers 100, 700.

In some embodiments, a motor (e.g., an internal combustion engine, one or more electric motors, etc.) can be mounted to the chassis 112 and covered by a motor cover. In some embodiments, the chassis 112 can be mounted or otherwise coupled to the front frame 114, which in some embodiments can be a separate frame coupled to a rear frame (not shown) in any conventional manner or can define a front portion of a single frame of the ride-on mowers 100, 700. In some embodiments, the ride-on mowers 100, 700 can comprise a single frame 114 upon which the motor is mounted (whether by a chassis 112 or otherwise). In some embodiments, the rear wheels 123 of the ride-on mower 100 can be mounted to the chassis 112 by a pair of rear wheel independent suspension assemblies, such as that which is shown and described in any one of U.S. Pat. Nos. 10,005, 437, 9,848,776, 9,707,842, 9,597,957, 9,481,242, 9,161,490, 8,397,367, 7,930,813, and/or 7,374,187, each of which is incorporated herein by reference. However, in other embodiments, the rear wheels 123 can instead be rigidly mounted to the mower front frame 114, can be coupled to an axle that can be pivoted with respect to the front frame 114, or can be attached to the front frame 114 in any other manner. Furthermore, while not shown, in some embodiments, a weight or weights may be added to a portion of the front frame 114, the pair of front wheel assemblies 122, and/or the cutter deck 108 so as to accommodate for variations in front-to-back weight distribution (e.g., the addition of a grass collector on the rear of the mower 100).

In some embodiments of the disclosure, the cutter deck 108 of the ride-on mower 100 can be in any location with respect to the front wheel assemblies 122 and rear wheels and with respect to the front frame 114. However, in the embodiments illustrated in FIGS. 1-5, the cutter deck 108 can be positioned between the front wheel assemblies 122 and rear wheels 123. In some embodiments, the cutter deck 108 can include at least one cutter (not shown) for cutting grass or other vegetation on a ground surface, and in some embodiments can be raised and lowered with respect to the ground surface. In some embodiments, the cutter deck 108 can be a floating or ground-following cutter deck. In some embodiments, the floating cutter deck 108 illustrated at least in FIG. 1 is presented by way of example only. In this embodiment, the cutter deck 108 can be coupled to and suspended from the front frame 114. In some embodiments, connection to the rear independent suspension assemblies can permit the cutter deck 108 to follow upward and downward movement of the rear wheels 123 in response to changing terrain elevation, thereby maintaining the cutter deck 108 in a more stable relationship with respect to the ground surface even as the ride-on mower 100 traverses uneven terrain. For example, the cutter deck 108 according to some embodiments of the disclosure can be directly or indirectly coupled to the front frame 114 of the ride-on mower 100 in a number of different manners, some of which provide different types of cutter deck movement and cutter deck performance. For example, the cutter deck 108 can be suspended entirely from the front frame 114 of the ride-on mower 100, or can be suspended at the front frame 114 and a rear independent suspension system. In some embodiments, the cutter deck 108 can be suspended from the front frame 114 by a front independent suspension system while being suspended from the rear by a frame of the ride-on mower 100. In some further embodiments, the cutter deck 108 can be directly or indirectly suspended from the rear by rear independent suspension systems while being suspended from the front by the front frame 114 of the ride-on mower 100. In some embodiments, the front end of the cutter deck 108 can be substantially unresponsive to upward and downward movement of the front wheel assemblies 122. However, the rear end of the cutter deck 108 can follow the upward and downward movement of the rear wheels by virtue of the cutter deck's connection to the rear independent suspension assemblies. Such connections can be established in a number of different manners, such as, e.g., bolts coupled at one end to respective brackets on the rear end of the cutter deck and to respective crank arms pivotally coupled to the rear independent suspension assemblies. In other embodiments, the cutter deck 108 can be coupled to the rear independent suspension assemblies in any other manner desired, such as by securing chains, cables, links, straps, bars, or other elements to the cutter deck 108 and to the rear independent suspension assemblies. However, as will be set forth in further detail below, in some embodiments, the front end of cutter deck 108 may be responsive to upward and downward movement of the front wheel assemblies 122, thereby enabling at least a portion of the cutter deck 108 to follow the travel of front wheel assembly 122 over varied terrain.

With reference again to the embodiment of some embodiments of the disclosure illustrated in FIGS. 1-5, the mowers 100, 700 can have a chassis 112, a front frame 114 (or in alternative embodiments, a front portion of a main frame), and a pair of front wheel independent suspension assemblies 116, 716. In some embodiments, the front frame 114 can be coupled to the chassis 112 by a plurality of bolts or other threaded fasteners. In some further embodiments, other conventional methods of fastening the front frame 114 to the chassis 112 can instead be used. By way of example only, the front frame 114 can be coupled to the chassis 112 by screws, rivets, pins, welding or brazing, inter-engaging elements, and the like, and/or can be integral with the chassis 112 in some embodiments. For purposes of reference in the following description, a substantially horizontal axis (axis 120 for mower 100 and axis 720 for mower 700) can run through the center of the front frame 114 and chassis 112 to divide the front frame 114 and chassis 112 into two sides. In some embodiments, the front frame 114 can include opposite sides and a front portion or section, each of which are defined by one or more beams, rods, bars, plates, or other structural members. For example, the front frame 114 in the illustrated embodiment is defined by side beams 115 and a front beam 117 coupled together by welds (although any other manner of connecting these elements together can instead be employed, including those mentioned above with regard to connection of the chassis 112 and frame 114). As shown in the embodiments of FIGS. 1-5, the side beams 115 can be substantially parallel to the horizontal axis 120, 720, while the front beam 117 is substantially orthogonal to the horizontal axis 120, 720. However, any other relative orientations of these beams 115, 117 can instead be employed in alternative embodiments. In some embodiments, the front frame 114 can comprise side beams 115 that are tubular. In some further embodiments, the front frame 114 can comprise front beams 117 that are tubular. In some further embodiments, the beams 115, 117 can include solid sections. In some embodiments, the beams 115, 117 can include square, rectangular, or I-beam cross-sections. In some further embodiments, the beams 115, 117 can include circular or elliptical cross-sections.

As will be appreciated by one having ordinary skill in the art, the front frame 114 of some embodiments of the disclosure can be constructed of a wide variety of structural elements. In some embodiments, these elements include tubular beams as mentioned above. Tubular beams provide a relatively strong and lightweight framework for the ride-on mower 100 compared to other structural members that can be employed. In other embodiments however, the front frame 114 can be constructed partially or entirely of different structural members, including without limitation bars, rods, non-tubular beams having any cross-sectional shape (e.g., L-shapes, I-shapes, C-shapes, etc.), plates, and the like. Accordingly, as used herein and in the appended claims, the term "beam" (whether referring to the front beam 117, a side beam 115, or any other beam of the front frame 114) is intended to encompass all of these structural members.

In some embodiments of the disclosure, the illustrated ride-on mowers 100, 700 can include front wheel independent suspension assemblies coupled to the front frame 114. For example, in some embodiments of the disclosure, the illustrated ride-on mower 100 can include a pair of front wheel independent suspension assemblies 116 coupled to the front frame 114. Further, for example, in some embodiments of the disclosure, the illustrated ride-on mower 700 can include a pair of front wheel independent suspension assemblies 716 coupled to the front frame 114. Although the independent suspension assemblies 116, 716 can be different in structure, elements, and/or connection, both independent suspension assemblies 116, 716 in the illustrated embodiments contain identical components and are mirror images of each other with respect to the horizontal axis 120, 720 respectively. In some embodiments, each of the pairs of independent suspension assemblies 116, 716 can be connected to a wheel assembly 122, with each wheel assembly including a ground-contacting wheel. However, in other embodiments, the independent suspension assemblies 116, 716 can instead have other types of rolling devices, including without limitation rollers, balls, and tires coupled in any conventional manner for rotation and for support of the front frame 114. For example, in some embodiments, each of the front wheel assemblies 122 may include caster wheel assemblies, with the caster wheel assemblies being supported by an axle 124 coupled to an inverted yoke 126. In some further embodiments, other types of rolling element mounting methods are possible, such as a bent axle extending outward and upward from the axis of rotation of the rolling element for coupling to the rest of the independent suspension assemblies 116, 716.

In some embodiments, each front wheel assembly 122 can be capable of pivoting about a vertical or substantially vertical axis, with up to 360° of rotation for each wheel. In this regard, in some embodiments, the front wheel assemblies 122 can be pivotally coupled to the rest of the front independent suspension assemblies 116, 716 in a number of different manners. For example, in some embodiments, the yokes 126 of the wheel assemblies 122 can be pivotally coupled to the rest of the front independent suspension assemblies 116, 716 by posts 128 extending vertically or substantially vertically from each yoke 126. In some embodiments, these yokes 126 can be pivotally coupled to the rest of their respective suspension assemblies 116, 716 in any conventional manner. By way of example only, a seal, washer, and bearings can be received on the posts 128 so that the posts 128 and yokes 126 can pivot with respect to the front frame 114.

Referring initially to the mower 100 shown in FIGS. 1-3, in some embodiments, the mower 100 can include front independent suspension assembly 116 with two laterally-extending pairs of suspension arms, where one laterally-extending pair of suspension arms is positioned pivotally coupling a front wheel assembly to mower 100 on one side of the axis 120, and another laterally-extending pair of suspension arms is positioned pivotally coupling a front wheel assembly to mower 100 on the opposite one side of the axis 120. For example, in some embodiments, the mower 100 can comprise laterally-extending suspension arm pair 144 on one side of the axis 120, and laterally-extending suspension arm pair 146 on the opposite side of the axis 120. In some embodiments, the suspension arm pair 144 can comprise suspension arm 144a and suspension arm 144b, which cooperate to form a 4-bar-linkage-type suspension configuration. In the non-limiting embodiments shown, the suspension arm 144a and suspension arm 144b are shown generally parallel to each other. With such a generally parallel configuration, angular movement of respective suspension arms 144a, 144b maintains the post 128 in a generally vertical orientation. This, in turn, maintains the respective wheel assemblies 122 in a generally vertical orientation, as well, regardless of the angular position of suspension arm pair 144, the benefits of which will be discussed in further detail below. However, in other embodiments, the suspension arm 144a and suspension arm 144b may be configured in an arrangement in which the respective suspension arms 144a, 144b are not entirely parallel to one another, but are still substantially parallel to one another. For example, the suspension arms 144a, 144b may be angled relative to one another by a certain amount (e.g., between 0°-5°, between 0°-10°, between 0°-20°), yet still be capable of maintaining the wheel assembly 122 in a substantially vertical orientation, even during changes in angular position of the suspension arm pair 144 during operation. Thus, in accordance with the disclosure, the suspension arms 144a, 144b may be substantially parallel to one another, which, for the purposes of this disclosure, includes the suspension arms 144a, 144b not only being entirely parallel to one another, but also includes the suspension arms 144a, 144b being slightly angled relative to one another (e.g., between 0°-5°, between 0°-10°, between 0°-20°).

In some embodiments, each of the suspension arms 144a, 144b may be pivotally coupled to an associated front wheel assembly 122 at a front structural member, such as, e.g., the front of the front frame 114. Furthermore, a suspension side arm 148 extending longitudinally relative to front frame 114 may pivotally couple the front wheel assembly 122 to the side of the front frame 114. In some embodiments, longitudinally-extending side suspension arm 148 is fixedly coupled via, e.g., welding to the respective front wheel assembly 122, yet pivotally coupled to the respective side of front frame 114. However, in other embodiments, side suspension arm 148 may also be pivotally coupled to the respective front wheel assembly 122 via any appropriate means. As will be described in further detail below, suspension side arm 148 is configured to provide structural support for the suspension arm pair 144 in a longitudinal direction, while still enabling suspension arm pair 144 to pivot relative to front frame 114.

Further, on the opposite side of the front frame 114, the suspension arm pair 146 may comprise suspension arm 146a and suspension arm 146b. Each of the suspension arms 146a, 146b can pivotally couple to an associated front wheel assembly 122 to the front of the front frame 114 on the opposite side. Another suspension side arm 148 extending longitudinally relative to front frame 114 may pivotally couple the front wheel assembly 122 to the side of the front frame 114 on the opposite side to where suspension arms 144a, 144b are pivotally coupled to the front frame 114. Additionally, the posts 128 can be pivotally coupled to the suspension arm pairs 144, 146 and fixedly or pivotally coupled to suspension side arms 148 on each side of the front frame 114. For example, in some embodiments, suspension arms 144a, 144b can be coupled to a joint 136 at one end and to a front plate 150 of the front beam 117 at the other end such that suspension arms 144a, 144b are vertically offset relative to one another, and suspension arms 146a, 146b can be coupled to the joint 136 and to the front plate 150 of the front beam 117 at the other end such that suspension arms 146a, 146b are also vertically offset from one another. Furthermore, similar to suspension arms 144a, 144b described above, suspension arms 146a, 146b may be substantially parallel to one another, which, for the purposes of this disclosure, includes the suspension arms 146a, 146b not only being entirely parallel to one another, but also includes the suspension arms 146a, 146b being slightly angled relative to one another (e.g., between 0°-5°, between 0°-10°, between 0°-20°).

Referring to FIGS. 4-5, a mower 700 having a floating deck is shown. However, it is to be understood that mower 700 is not limited to use with a floating deck, and a ground-following deck may be used. In some embodiments, mower 700 may include front independent suspension assembly 716 with two pairs of suspension arms, where one pair of suspension arms is positioned coupling a front wheel assembly to mower 700 on one side of the axis 720, and another pair of suspension arms is positioned coupling another front wheel assembly to mower 700 on the opposite one side of the axis 720. For example, in some embodiments, the mower 700 can comprise suspension arm pair 744 on one side of the axis 720, and suspension arm pair 746 on the opposite side. In some embodiments, the suspension arm pair 744 can comprise suspension arm 744a and suspension arm 744b. In the non-limiting embodiments shown, the suspension arm 744a and suspension arm 744b are shown generally parallel to each other. In other embodiments, the suspension arm 744a and suspension arm 744b can include a generally non-parallel arrangement, i.e., substantially parallel to one another, as discussed above with respect to suspension arms 144a, 144b, 146a, 146b. In some embodiments, each of the suspension arms 744a, 744b can be coupled to an associated front wheel assembly 122 at the front of the front frame 114. Further, a suspension side arm 148 can couple the front wheel assembly 122 to the side of the front frame 114. Further, on the opposite side of the front frame 114, the suspension arm pair 746 can comprise suspension arm 746a and suspension arm 746b. Each of the suspension arms 746a, 746b can couple to an associated front wheel assembly 122 to the front of the front frame 114 on the opposite side. Further, a suspension side arm 148 can couple the front wheel assembly 122 to the side of the front frame 114 on the opposite side to where suspension arms 744a, 744b are coupled to the front frame 114. Further, the posts 128 can be pivotally coupled to the suspension arm pairs 744, 746 and the suspension side arms 148 on each side of the front frame 114. For example, in some embodiments, suspension arms 744a, 744b can be coupled to the joint 136 at one end and to the front plate 150 of the front beam 117 at the other end, and suspension arms 746a, 746b can be coupled to the joint 136 and to the front plate 150 of the front beam 117 at the other end.

Referring to the embodiments of FIGS. 1-3 and 4-5, in some aspects, the joint 136 can include one or more flanges 138 to which any one of the suspension arms 144a, 144b, 146a, 146b, 744a, 744b, 746a, 746b can be coupled. For example, in some embodiments, suspension arms 144a, 144b can be coupled to flanges 138 of joint 136 at one end and to the front beam 117 at the other end, and suspension arms 746a, 746b can be coupled to flanges 138 of the joint 136 and to the front beam 117 at the other end. In certain embodiments, the ends of suspension arms 144a, 144b, 146a, 146b, 744a, 744b, 746a, 746b that are coupled to flanges 138 are pivotally coupled at or near the respective ends of each flange 138, which may provide for a stable connection between the front beam 117 and the joints 136. However, it is to be understood that the respective ends of suspension arms 144a, 144b, 146a, 146b, 744a, 744b, 746a, 746b may be more narrowly spaced on flange 138 than the distances shown in FIGS. 1-3 and 4-5.

In some embodiments, each joint 136 can take a number of different forms, and in the embodiment of FIGS. 1-3, and the embodiment of FIGS. 4-5, can be a cylindrical member within which the post 128 is received. Each post 128 can be secured within corresponding joint 136 by a nut or other threaded fastener screwed upon a threaded end of the post 128. If desired, additional hardware can help secure this connection. For example, in some embodiments, one or more cotter pins can be clipped to the nut and/or post 128, can be received within an aperture or recess within the nut and/or post 128, or can be coupled to the post 128 in any other conventional manner to prevent disconnection of the nut from the post 128. As another example, one or more washers can be provided as needed to distribute force and secure the connection of the posts 128 to the joints 136.

As an alternative to the use of a cylindrical joint 136 as described above in order to connect the post 128 of each front independent suspension assembly 116, 716 to the suspension arms 144a, 144b, 146a, 146b, 744a, 744b, 746a, 746b, the joint 136 can be a socket within which an end of the post 128 is received, and can be defined by an aperture in any of the suspension arms 144a, 144b, 146a, 146b, 744a, 744b, 746a, 746b, and the like. Any conventional joint structure can be employed to establish this connection of the post 128 and wheel assembly 122, each of which falls within the spirit and scope of some embodiments of the disclosure.

An advantage of a cylindrical joint 136 as described above is the ability to receive bearings therein and to house and protect the bearings. In this regard, other elements and structure can be used to enable the wheel assemblies 122 to pivot properly. For example, depending upon the type of joint 136 employed, ball bearings, roller bearings, sleeves or linings made of low-friction material, and other elements can be used as desired (with or without lubricating material). In the illustrated embodiment, two sets of roller bearings can be received within the joint 136, and can be seated within lips, ledges, or other structure of the joint 136. However, any other manner of retaining these and other types of bearings can be used, depending at least partially upon the type of joint 136 employed to connect the wheel assemblies 122 with respect to the rest of the front independent suspension assemblies 116, 716.

In some embodiments, a threaded connection can be employed to secure the post 128 with respect to the rest of the front independent suspension assemblies 116, 716; however a number of other type of connections can be used. By way of example only, the post 128 can be snap-fit, press-fit, or screwed into the joint 136 (or within a collar, lug, socket, or other fitting within the joint 136), and can be assembled on opposite ends or sides of the joint 136 using any conventional fasteners, and the like. In some embodiments, it may be desirable to protect the joint 136 and its components from dirt, debris, and other foreign materials and to retain any lubricant material therein. To this end, the joint 136 can be capped, received within a boot, grommet, housing, or shroud, and the like.

In some embodiments, suspension arms 144a, 144b, 146a, 146b, 744a, 744b, 746a, 746b can be coupled to the front plate 150 at a common location on the front of the front frame 114 (generally at or near the central region of the front beam 117). In some embodiments, any of the suspension arms 144a, 144b, 146a, 146b, 744a, 744b, 746a, 746b can be coupled to the front frame 114 using a conventional bolt or other fastener, by another common connection such as, e.g., a spherical ball joint, or otherwise. Alternatively, in other embodiments, any of the suspension arms 144a, 144b, 146a, 146b, 744a, 744b, 746a, 746b can be coupled to the front of the front frame 114 at different locations along the front of the front frame 114 (i.e., near or adjacent to the locations shown in FIGS. 1-3 and 4-5).

In some embodiments, the suspension arms 144a, 144b, 146a, 146b, 744a, 744b, 746a, 746b and/or the suspension side arms 148 can be elongated tubular elements. However, in other embodiments, the suspension arms 144*a*, 144*b*, 146*a*, 146*b*, 744*a*, 744*b*, 746*a*, 746*b* and/or the suspension side arms 148 can be bars, beams (e.g., cast iron I-shaped beams), etc. In some further embodiments, the suspension arms 144*a*, 144*b*, 146*a*, 146*b*, 744*a*, 744*b*, 746*a*, 746*b* and/or the suspension side arms 148 can include solid sections. In some embodiments, the suspension arms 144*a*, 144*b*, 146*a*, 146*b*, 744*a*, 744*b*, 746*a*, 746*b* and/or the suspension side arms 148 can include square or rectangular cross-sections. In some further embodiments, the suspension arms 144*a*, 144*b*, 146*a*, 146*b*, 744*a*, 744*b*, 746*a*, 746*b* and/or the suspension side arms 148 can include circular or elliptical cross-sections.

In some embodiments, the suspension arms 144*a*, 144*b* and suspension side arms 148 can couple to the joint 136 with an acute angle therebetween. In other embodiments, the suspension arms 144*a*, 144*b* and suspension side arms 148 can couple to the joint 136 with an obtuse angle therebetween. In some further embodiments, the suspension arms 144*a*, 144*b* and suspension side arms 148 can couple to the joint 136 forming an angle of about 90° therebetween. In some further embodiments, the suspension arms 146*a*, 146*b* and suspension side arms 148 can couple to the joint 136 with an acute angle therebetween. In other embodiments, the suspension arms 146*a*, 146*b* and suspension side arms 148 can couple to the joint 136 with an obtuse angle therebetween. In some further embodiments, the suspension arms 146*a*, 146*b* and suspension side arms 148 can couple to the joint 136 forming an angle of about 90° therebetween. In some embodiments, the suspension arms 744*a*, 744*b* and suspension side arms 148 can couple to the joint 136 with an acute angle therebetween. In other embodiments, the suspension arms 744*a*, 744*b* and suspension side arms 148 can couple to the joint 136 with an obtuse angle therebetween. In some further embodiments, the suspension arms 744*a*, 744*b* and suspension side arms 148 can couple to the joint 136 forming an angle of about 90° therebetween. In some embodiments, the suspension arms 746*a*, 746*b* and suspension side arms 148 can couple to the joint 136 with an acute angle therebetween. In other embodiments, the suspension arms 746*a*, 746*b* and suspension side arms 148 can couple to the joint 136 with an obtuse angle therebetween. In some further embodiments, the suspension arms 746*a*, 746*b* and suspension side arms 148 can couple to the joint 136 forming an angle of about 90° therebetween.

The suspension arms 144*a*, 144*b*, 146*a*, 146*b*, 744*a*, 744*b*, 746*a*, 746*b* can have any relative length. For example, suspension arms 144*a*, 144*b*, 146*a*, 146*b*, 744*a*, 744*b*, 746*a*, 746*b* can be any length between, e.g., 10 inches and 25 inches, dependent upon the size and model of the mower (and the size/width of front frame 114). Additionally, suspension side arms 148 can also be any relative length such as between, e.g., 20 inches and 30 inches long. However, it is to be understood that the above lengths are only examples, and suspensions arms 144*a*, 144*b*, 146*a*, 146*b*, 744*a*, 744*b*, 746*a*, 746*b* and/or suspension side arms 148 can be longer or shorter than that which is described. Furthermore, each spaced-apart suspension arm may have a different length than its neighboring suspension arm. For example, suspension arm 144*a* may be longer or shorter than suspension arm 144*b*, suspension arm 146*a* may be longer or shorter than suspension arm 146*b*, etc.

As shown, the alternative embodiments of FIGS. 1-3 and FIGS. 4-5 can comprise different lengths of the suspension arms 144*a*, 144*b*, 146*a*, 146*b*, as compared to the suspension arms 744*a*, 744*b*, 746*a*, 746*b*. In the illustrated embodiment of FIGS. 1-3 for example, the suspension arms 144*a*, 144*b*, 146*a*, 146*b* are shorter than the suspension side arm 148, and are shorter than the suspension arms 744*a*, 744*b*, 746*a*, 746*b*. Further, in the illustrated embodiment of FIGS. 4-5 for example, the suspension arms 744*a*, 744*b*, 746*a*, 746*b* are shorter than the side suspension arm 148. As 144*a*, 144*b*, 146*a*, 146*b* are shown as being shorter than suspension arms 744*a*, 744*b*, 746*a*, 746*b*, the inward lateral movement of each wheel assembly 122 as it moves through the suspension travel is greater. That is, as each wheel assembly 122 moves up or down relative to changes in terrain, the shorter suspension arms 144*a*, 144*b*, 146*a*, 146*b* provide a shorter radius for angular travel for each wheel assembly 122 as compared to the longer suspension arms 744*a*, 744*b*, 746*a*, 746*b*. With such a short radius, the inward lateral movement of each wheel assembly 122 throughout suspension travel is increased. Thus, in some embodiments, it may be beneficial to provide suspension arms having longer lengths (such as, e.g., suspension arms 744*a*, 744*b*, 746*a*, 746*b*) so as to minimize inward lateral movement of each wheel assembly 122 during operation of the mower over varied terrain.

In some embodiments, any of the suspension arms 144*a*, 144*b*, 146*a*, 146*b*, 744*a*, 744*b*, 746*a*, 746*b*, and/or suspension side arm 148 can be welded to the joint 136. In other embodiments, the suspension arms 144*a*, 144*b*, 146*a*, 146*b*, 744*a*, 744*b*, 746*a*, 746*b*, and/or side suspension arm 148 can be coupled to the joint 136 in any other manner, including without limitation by brazing, by one or more conventional fasteners such as screws, bolts, rivets, clamps, clips, and the like, by pin and aperture, finger and slot, hook and aperture, and other types of connections, by threaded, press-fit, or snap-fit connections, by inter-engaging elements, and the like. As an alternative to direct connection to the joint 136, any of the suspension arms 144*a*, 144*b*, 146*a*, 146*b*, 744*a*, 744*b*, 746*a*, 746*b*, and/or suspension side arm 148 can be indirectly coupled to the joint 136, such as by connection to a brace, strut, plate, reinforcement or other element coupled to the joint 136, by connection of the first suspension arm 146 directly to the joint 136 and by connection of the second suspension side arm 148 to the first suspension arm 146 (or vice versa), and the like.

In some further embodiments, suspension arms 144*a*, 144*b*, 146*a*, 146*b*, 744*a*, 744*b*, 746*a*, 746*b*, and/or suspension side arm 148 can be supplemented by additional suspension arms (e.g., such as an upper and lower second side suspension arms. Each of the suspension arms 144*a*, 146*a*, 146*b*, 744*a*, 744*b*, 746*a*, 746*b*, and/or suspension side arm 148, and any additional suspension arms can be coupled directly to the front frame 114 in a number of different manners. In some embodiments, the suspension arms 144*a*, 144*b*, 146*a*, 146*b*, 744*a*, 744*b*, 746*a*, 746*b*, and/or suspension side arm 148, and any additional suspension arms can be pivotally coupled to the front frame 114 to enable upward and downward movement of the front independent suspension assemblies 116, 716. Any type of pivotable connection can be employed, such as, e.g., a spherical ball joint, a ball and socket connection, a pivot and aperture connection, a hinge connection, and the like. One having ordinary skill in the art will appreciate that still other manners of pivotal connection are possible.

Although direct connection to the front frame 114 is possible, any of the suspension arms 144*a*, 144*b*, 146*a*, 146*b*, 744*a*, 744*b*, 746*a*, 746*b*, and/or suspension side arm 148, and any additional suspension arms, can be coupled to plates, bars, rods, or other elements shaped to provide an improved interface between the suspension arms 144*a*, 144*b*, 146*a*, 146*b*, 744*a*, 744*b*, 746*a*, 746*b*, and/or suspension side arm 148, and any additional suspension arms, and the front frame 114. More specifically, the suspension arms 144a, 144b, 146a, 146b, 744a, 744b, 746a, 746b, and/or suspension side arm 148, and any additional suspension arms can be oriented at an angle with respect to that part of the front frame 114 to which they connect, thereby making such a connection more difficult. Therefore, the suspension arms 144a, 144b, 146a, 146b, 744a, 744b, 746a, 746b, and/or suspension side arm 148, and any additional suspension arms of some embodiments described herein can be coupled to elements shaped to better establish an angled connection to the front frame 114. For example, as described earlier, in some embodiments, any of the suspension arms 144a, 144b, 146a, 146b, 744a, 744b, 746a, 746b can be coupled to a suspension front plate 150 on the front of the front frame 114, while the suspension side arm 148 can be coupled to a suspension side plate of the side of the front frame 114. These suspension front and side plates can be welded to the front frame 114, or can be coupled thereto by fasteners or in any of the manners described above with reference to the connection between the suspension arms 144a, 144b, 146a, 146b, 744a, 744b, 746a, 746b, and the joint 136. In some embodiments, the suspension front and side plates can even be integral with the front frame 114, such as by being stamped, molded, pressed, cast, or otherwise defined by a part of the front frame 114.

Each suspension arm 144a, 144b, 146a, 146b, 744a, 744b, 746a, 746b can be pivotally coupled to the front of the front frame 114 (and in some cases, to a common suspension front plate 150 or to respective suspension front plates) by a front pivot assembly. In some embodiments for example, the front pivot assembly can comprise ball joints attached the suspension arms 144a, 144b, 146a, 146b, 744a, 744b, 746a, 746b by a threaded fastener such as a nut threaded onto a threaded extension of the ball joint, a pair of joint seals, and a bolt passed through apertures in the ball joint and joint seals. If desired, a spacer can be located between the ball joint and the front plate to provide clearance between the ball joint and the front plate. The ball joint can instead be coupled to the suspension arms 144a, 144b, 146a, 146b, 744a, 744b, 746a, 746b by being threaded into a threaded aperture therein, by one or more conventional fasteners, or in any of the manners described above with reference to the connection between the suspension arms 144a, 144b, 146a, 146b, 744a, 744b, 746a, 746b, and suspension side arm 148 and the joint 136. Although not required, the joint seals can be employed for purposes of keeping the ball joint free of dirt, debris, and foreign matter. In some embodiments, a bolt can be employed for pivotable connection to the ball joint as described above. However, the bolt can be replaced by any other element received within the ball joint, including without limitation a pin or rod, a headed post, extension, or any other element extending into the ball joint from the front plate 150 or front frame 114. In other embodiments, a ball joint socket can be attached to the front plate 150 or front frame 114 and can pivotally receive a pin, rod, headed post, extension, or other element attached to the suspension arms 144a, 144b, 146a, 146b, 744a, 744b, 746a, 746b. The bolt of the front pivot assembly can extend into an aperture in the suspension front plate 150 and can be secured therein by a nut or other conventional fastener.

As discussed above, the suspension front plate 150 can be shaped to connect the suspension arms 144a, 144b, 146a, 146b, 744a, 744b, 746a, 746b at an angle with respect to the front of the front frame 114. One having ordinary skill in the art will appreciate that a number of different front plate shapes can be employed to establish this angled connection. By way of example only, the suspension front plate 150 can have a wing, flange, arm, tab, or other portions or regions that provide a mounting location disposed at an angle with respect to the front of the front frame 114. In embodiments in which both front independent suspension systems are coupled to a common suspension front plate 150 (e.g., as shown in FIGS. 1-5), the suspension front plate 150 can include a plurality of portions or regions providing a plurality of mounting locations disposed at specific angles and with respect to the front of the front frame 114. For different suspension and handling characteristics of the ride-on mower 100, the suspension arms 144a, 144b, 146a, 146b, 744a, 744b, 746a, 746b in some embodiments can be coupled to the suspension front plate 150 in various provided locations, and differences in position can provide different handling characteristics of the ride-on mowers 100, 700.

With continued reference to FIGS. 3 and 5, the suspension side arm 148 can be mounted to the front frame 114 by a side pivot assembly 170. The suspension side arm 148 can be coupled to the front frame 114 via a side plate. In some embodiments, the suspension side arm 148 can be coupled to a wing, flange, extension, tab, or other portion of the suspension side plate disposed at an angle with respect to the side of the front frame 114 for the same reasons discussed above. In some embodiments, a bolt can be received within a ball joint, joint seals, a spacer, and an aperture in the suspension side plate, and can be retained therein by a nut. The alternative assemblies and elements described above with reference to the connection between the suspension arms 144a, 144b, 146a, 146b, 744a, 744b, 746a, 746b and the suspension front plate 150 (or directly to the front frame 114 in other embodiments) apply equally to the connection between the suspension side arm 148 and the suspension side plate or front frame 114.

The front and side pivot assemblies can allow the suspension arms 144a, 144b, 146a, 146b, 744a, 744b, 746a, 746b, and/or the suspension side arm 148 to move in a substantially upward and downward vertical direction relative to the front frame 114. Depending at least partially on any of the lengths of the suspension arms 144a, 144b, 146a, 146b, 744a, 744b, 746a, 746b, and/or the suspension side arm 148 and the location of their direct or indirect connection to the front frame 114, other movement such as curved or horizontal movement can be possible.

Referring still to FIG. 3 and FIG. 5, in some embodiments of the disclosure, the cutter deck 108 may be at least partially coupled to the front independent suspension assemblies 116, 716 so as to allow at least a portion of the cutter deck 108 to substantially follow the upward and downward travel of the front wheel assemblies 122 as they move over varied terrain. For example, each suspension side arm 148 may include a mounting block 162, which may be attached or affixed to a surface of the suspension side arms 148 through any appropriate means such as, e.g., welding, fasteners, brazing, etc. Pivotally coupled to each mounting block 162 is a bell crank 160, with bell crank 160 being coupled at a first end to a deck height control arm 168 and at a second end to a deck linkage 164. The deck linkage 164 is also coupled to an attachment plate 166 extending from a top surface of the cutter deck 108 near the front of cutter deck 108. While FIG. 3 and FIG. 5 only show a single mounting block 162, a single bell crank 160, etc., it is to be understood that each respective side of the cutter deck 108 and each front independent suspension assembly 116, 716 may comprise the same or similar components.

As the mower 100, 700 moves over varied terrain, the respective front independent suspension assemblies 116, 716 may allow the front wheel assemblies 122 to independently move upward and/or downward in response to the terrain. Correspondingly, as suspension side arms 148 move upward and/or downward with the vertical motion of front wheel assemblies 122, the mounting blocks 162 and bell cranks 160 also move upward and/or downward. Such upward and/or downward movement also causes the deck linkage(s) 164 to raise or lower at least the front portion of cutter deck 108, thereby allowing at least a portion of the cutter deck 108 proximate to the front wheel assemblies 122 to move upward and/or downward in reaction to corresponding movement of the front wheel assemblies 122. In this way, cutter deck 108 may be able to maintain an even cut over varied or undulating terrain, and undesirable occurrences such as scalping of the ground surface may be avoided.

In some embodiments of the disclosure, it is desirable to strengthen the front independent suspension assemblies 116, 716 and/or to provide additional structure to which other elements, structure, and devices of the front independent suspension assemblies 116, 716 can be coupled. Such additional structure can include one or more plates, rods, bars, tabs, wings, extensions, bosses, platforms, struts, and other framework coupled to the suspension arms 144*a*, 144*b*, 146*a*, 146*b*, 744*a*, 744*b*, 746*a*, 746*b*, and/or the suspension side arm 148, and/or the joint 136. These elements and structure can be coupled to the suspension arms 144*a*, 144*b*, 146*a*, 146*b*, 744*a*, 744*b*, 746*a*, 746*b*, and/or the suspension side arm 148 and joint 136 in any conventional manner, including those manners described above with reference to the connection between the suspension arms 144*a*, 144*b*, 146*a*, 146*b*, 744*a*, 744*b*, 746*a*, 746*b*, and/or the suspension side arm 148 and/or the joint 136. In some embodiments for example, a support plate can be positioned between any of the suspension arms 144*a*, 144*b*, 146*a*, 146*b*, 744*a*, 744*b*, 746*a*, 746*b* and the suspension side arms 148.

Some embodiments of the disclosure include one or more shock-absorbing components that can be coupled between portions of the chassis 112 and one or more wheels to control shock and vibration. For example, referring to FIG. 6, illustrating a perspective view of a portion of a suspension assembly with 4-bar linkage in accordance with some embodiments of the disclosure, some embodiments of each front independent suspension assembly 116 can be connected to a shock absorber assembly, with each shock absorber assembly including a shock absorber 302 and/or a suspension spring 188. FIG. 6 illustrates a portion of a suspension assembly of the mower 700 embodiment shown in FIGS. 4-5, but includes the structure of the mower 100 embodiment of FIGS. 1-3 with a different 4-bar linkage (i.e., the suspension arms 744*a*, 744*b* coupled to joint 136 and suspension arms 746*a*, 746*b* coupled to a joint 136 can be replaced in FIG. 6 with suspension arms 144*a*, 144*b* coupled to joint 136 and suspension arms 146*a*, 146*b* coupled to a joint 136 between each of the embodiments of the mowers 100, 700).

In some embodiments, the shock absorber 302 and the suspension spring 188 can be pivotally coupled between the front frame 114 and the front independent suspension assemblies 116, 716 to absorb shock transmitted from the wheel assemblies 122 and to bias the front independent suspension assembly 116, 716 in a downward direction. As the front independent suspension assemblies 116, 716 of the ride-on mower 100 travel in generally upward and downward vertical directions due to the wheel assemblies 122 traversing uneven terrain, the shock absorbers 302 (if used) can dampen the shock delivered to the mower front frame 114, chassis 112, and operator. In some embodiments, this can create a more comfortable ride for the operator, thereby allowing the operator to run the mowers 100, 700 at increased speeds to achieve improved mowing and/or travel efficiency.

In some embodiments, the shock absorber 302 can be a conventional hydraulic shock absorber. However, in some embodiments, the shock absorber 302 can take a number of other forms, including, without limitation, an air shock, an airbag, a coil, torsion, or other spring, a rubber pillow block, and the like. Although the shock absorber 302 can be coupled in any conventional manner to the front frame 114 and to any part of the front independent suspension assemblies 116, 716, the shock absorber 302 in the embodiment illustrated in FIGS. 1-6 can be coupled at one end to the support plate 179 that extends from the suspension side arm 148, and can be coupled at the other end to the front frame 114 (or a fixture on or extending from the front frame 114). In this regard, in some embodiments, the shock absorber 302 can be welded or brazed to the support plate 179 and front frame 114, or can be coupled thereto with bolts, screws, rivets, pins, clips, clamps, or other conventional fasteners, or can be coupled thereto in any other manner desired. In some embodiments, the shock absorber 302 can be received through an aperture in the support plate 179 for connection to a bottom or underside portion thereof. In some embodiments, the shock absorber 302 can include a top mount and a bottom mount, where each mount includes an aperture, respectively, to receive fasteners therethrough. In some embodiments, the fasteners (which can be bolts or can be any other conventional fastener) can be received through one or more apertures in the support plate and a bracket extending from the front frame 114 and through the apertures in the top and bottom mounts of the shock absorber 302. In some embodiments such as that shown in the figures, the support plate 179 can be shaped to define a bracket for connection to the bottom mount of the shock absorber 302. Further, in some embodiments, nuts or other fasteners can be employed to secure the fasteners once installed. Additional hardware such as spacers and washers can be employed as needed to couple the shock absorber 302 to the front frame 114 and to the rest of the front independent suspension assemblies 116, 716.

In some embodiments, the suspension spring 188 in the embodiments of FIGS. 1-6 can comprise a coil spring that can be retained in position using various conventional coupling methods in order to bias the rest of the suspension assemblies 116, 716 in a downward direction. In some embodiments for example, the suspension spring 188 can be received upon a spring retainer on the support plate 179 and upon a spring retainer coupled to the front frame 114. In some embodiments, the spring retainers can be clips, clamps, or other elements employed to hold the spring 188 in place. In some embodiments, the spring retainers can be inserts that are received within the ends of each spring 188 and are coupled to the support plate and the front frame 114 in any conventional manner. In other embodiments, the spring retainers can be sockets within which the ends of the springs 188 can be received, or recesses in the support plate 179 and front frame 114 (or structure attached thereto), clamps, brazing, or welds holding either or both ends of the spring 188 in place, and any other conventional holding component for the springs 188. In some other embodiments of the disclosure, as an alternative to connection of a spring retainers directly to the support plate 179 and front frame 114, either or both of these retainers can be coupled to an adjusting element or device for changing the amount of compression of the spring 188. For example, the upper end of the springs 188 in the illustrated embodiments can each seat against an adjusting plate received within a spring seat defined by the front frame 114 or coupled to the front frame 114 in any conventional manner. The spring seat can be provided with an aperture within which is received an adjustment screw or other threaded fastener. The screw can be received through the spring seat aperture and into an aperture in the adjusting plate so that turning the screw causes the adjusting plate to compress or reduce the compression upon the spring 188. If desired, one or more guides can extend from the adjusting plate to be received within extensions of the spring seat aperture or dedicated apertures in order to prevent the adjusting plate from turning with the screw. Once the screw has been turned to move the adjusting plate to a desired position, a nut can be tightened on the screw to hold the screw and adjusting plate in place. Although the spring seat, adjusting plate, adjustment screw, and nut are described above as being associated with an upper end of the spring 188, this type of adjustment mechanism can also or instead be provided on the bottom end of the spring 188. In addition, it should be noted that a number of other spring adjustment mechanisms exist and can be used to adjust compression of the springs 188 in some embodiments of the disclosure. Each of these alternative spring adjustment mechanisms falls within the spirit and scope of some embodiments of the disclosure.

The front independent suspension assemblies 116, 716 can also absorb a significant amount of vertical movement caused by the uneven terrain, thereby preventing much of the vertical movement of the front frame 114 and chassis 112. As a result, vertical movement of the cutter deck 108 can be reduced to improve the cutting performance of the ride-on mower 100. In addition, when one of the front wheel assemblies 122 runs over a large rock, bump, dip, hole, or otherwise experiences a change in elevation causing the wheel assembly 122 to move vertically upward or downward, the improved front independent suspension assemblies 116, 716 of some embodiments of the disclosure dampen the effect on the other wheels.

In some embodiments, each front independent suspension assembly 116, 716 may be configured to independently pivot at an angle of up to ±45° relative to chassis 112 and/or frame 114, thereby enabling upward and/or downward displacement of each respective wheel assembly 122 corresponding to the pivot angle. In other embodiments, the pivot angle range relative to chassis 112 may be narrower (e.g., ±2°, +50, +15°, +30°, etc.) and may rely on a variety of factors such as, e.g., length of the suspension arms 144a, 144b, 146a, 146b, 744a, 744b, 746a, 746b and the suspension side arms 148, allotted travel of shock absorber 302 and the suspension spring 188, etc. In this way, each respective wheel assembly 122 is capable of upward and/or downward displacement during travel, with the maximum displacement limited by factors such as the length of the suspension arms 144a, 144b, 146a, 146b, 744a, 744b, 746a, 746b and the suspension side arms 148, as well as the allotted travel of shock absorber 302 and the suspension spring 188. In one embodiment, the shock absorber 302 and/or suspension spring 188 may be configured 3 inches of travel, which, in turn, allows for at least ±3 inches of vertical displacement of each wheel assembly 122. However, it is to be understood that this example is not limiting, and lesser or greater vertical displacement is possible in accordance with other embodiments.

Unlike prior suspension designs, which change the angular cant of the wheels through the travel of the suspension, in some embodiments, the front independent suspension assemblies 116, 716 can limit or eliminate changes in wheel cant throughout the travel of the suspension. That is, the 4-bar linkage configuration of front independent suspension assemblies 116, 716 operates to maintain each front wheel assembly 122 (and joint 136) in a substantially vertical orientation relative to the ground surface, regardless of the position of travel. As a result, wobble of the front wheel assemblies 122 similar to that encountered with shopping cart wheels, which previously occurred due to changes in angular cant of the front wheel assemblies 122 throughout suspension travel, can be limited or completely eliminated. Thus, the wheels maintain better contact with the ground surface, giving the ride-on mower 100 better traction. Furthermore, the substantially vertical orientation of each front wheel assembly 122, regardless of position of travel, also helps to prevent uneven tire wear, which was previously caused by the above-referenced changes in angular cant of the front wheel assemblies due to suspension travel.

Figure 7A:
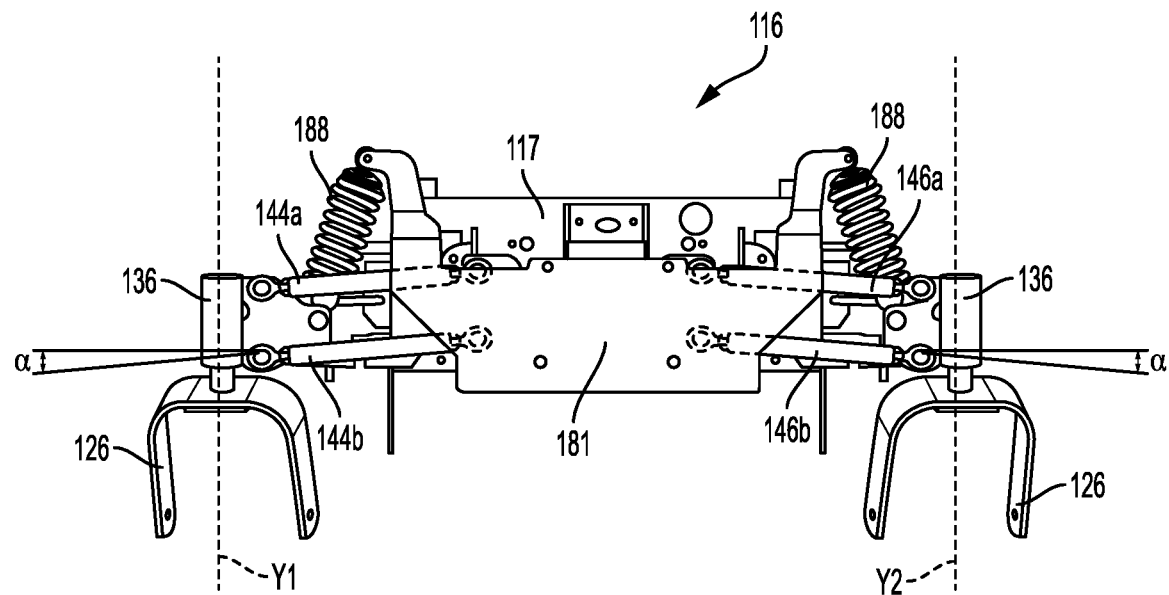
FIG. 7A illustrates a partial front view of a front wheel independent suspension assembly in a first configuration in accordance with an aspect of the disclosure.

For example, referring to FIGS. 7A-7D, various partial views of front independent suspension assembly 116 in accordance with an aspect of the disclosure are shown. For clarity, numerous components of the mower to which front independent suspension assembly 116 is coupled have been omitted from FIGS. 7A-7D, including, e.g., front wheel assemblies 122. FIG. 7A illustrates front independent suspension assembly 116 in an unloaded state, wherein each suspension spring 188 is in an unloaded, extended position. In this state, respective suspension arms 144a, 144b, 146a, 146c are biased at an angle α relative to horizontal such that each joint 136 upon which the front wheel assemblies (not shown) are mounted are biased in a slightly downward direction relative to the front beam 117. The angle α may vary based on, e.g., length of the suspension arms 144a, 144b, 146a, 146b, allotted travel of the shock absorber and the suspension spring 188, etc. For example, in one embodiment, angle α may be 2° relative to horizontal.

However, even with angular displacement of respective suspension arms 144a, 144b, 146a, 146c relative to the front beam 117, the 4-bar linkage arrangement of front independent suspension assembly 116 enables each joint 136 (and, thus, each coupled wheel assembly) to be maintained in a substantially vertical orientation relative to the ground surface. That is, each joint 136 remains substantially in-line with a respective vertical axis Y1, Y2, as shown in FIG. 7A, even when respective suspension arms 144a, 144b, 146a, 146c are biased at an angle α. If each joint 136 were only coupled to a single suspension arm (i.e., a non-4-bar linkage arrangement), such continuous vertical alignment of joints 136 with respective vertical axes Y1, Y2 would not be achieved, thereby leading to angular cant of the wheels which, as described above, may lead to reduced ground contact, uneven tire wear, etc.

Figure 7B:
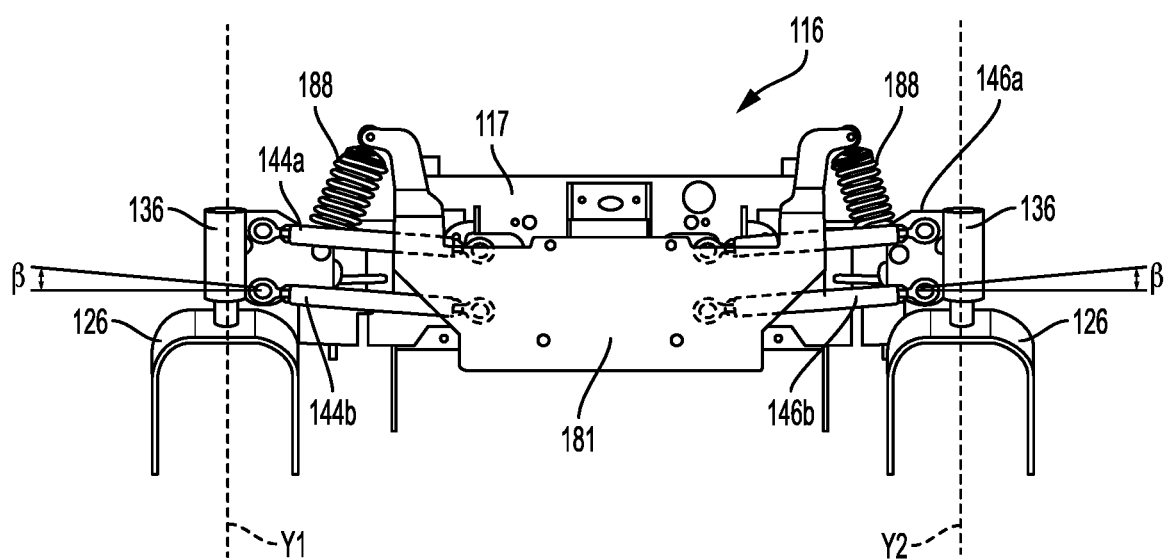
FIG. 7B illustrates the front wheel independent suspension assembly of FIG. 7A in a second configuration.

Referring now to FIG. 7B, front independent suspension assembly 116 is illustrated in a fully-loaded state, wherein each suspension spring 188 is in a compressed position. In this state, respective suspension arms 144a, 144b, 146a, 146c are biased at an angle 3 relative to horizontal such that each joint 136 upon which the front wheel assemblies (not shown) are mounted are supported in a slightly upward direction relative to the front beam 117. Similar to angle α disclosed above, the angle β may vary based on, e.g., length of the suspension arms 144a, 144b, 146a, 146b, allotted travel of the shock absorber and the suspension spring 188, etc. For example, in one embodiment, angle β may be 2° relative to horizontal, equating to approximately 2½" of travel allotted by the shock absorber and the suspension spring 188. However, it is to be understood that angle α and angle β need not be equal, and may vary based on, e.g., length of the suspension arms 144a, 144b, 146a, 146b, allotted travel of the shock absorber and the suspension spring 188, etc.

Once again, even with angular displacement of respective suspension arms 144a, 144b, 146a, 146c relative to the front beam 117 by angle β, the 4-bar linkage arrangement of front independent suspension assembly 116 enables each joint 136 (and, thus, each coupled wheel assembly) to be maintained in a substantially vertical orientation relative to the ground surface. That is, each joint 136 remains in-line with a respective vertical axis Y1, Y2, as shown in FIG. 7B, even when respective suspension arms 144a, 144b, 146a, 146c are biased at an angle β under fully-loaded conditions.

Figure 7C:
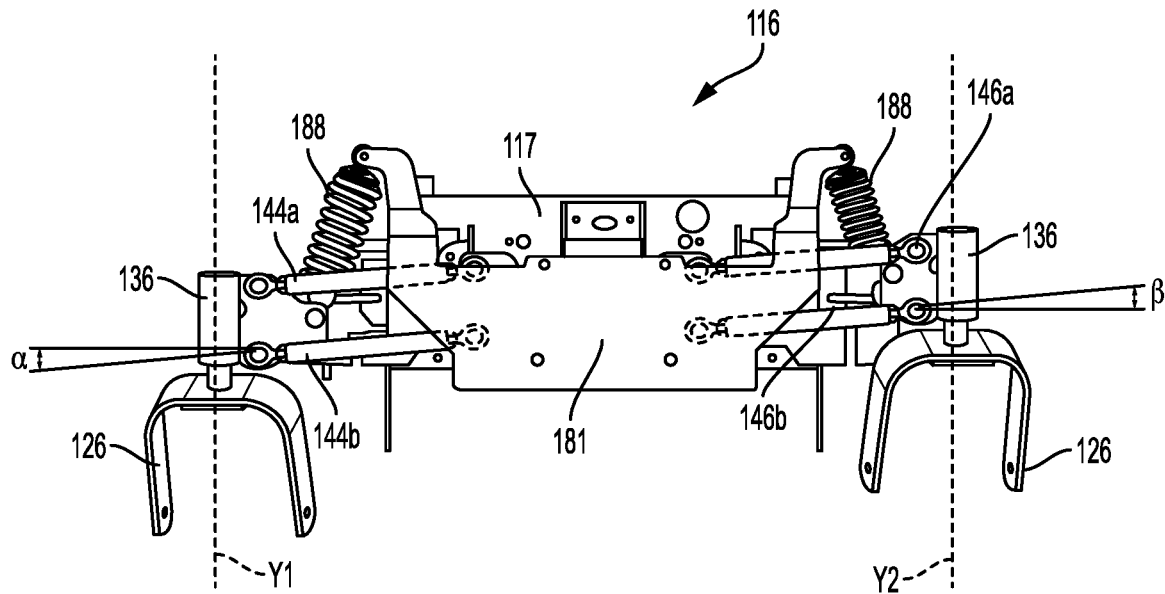
FIG. 7C illustrates the front wheel independent suspension assembly of FIG. 7A in a third configuration.
Figure 7D:
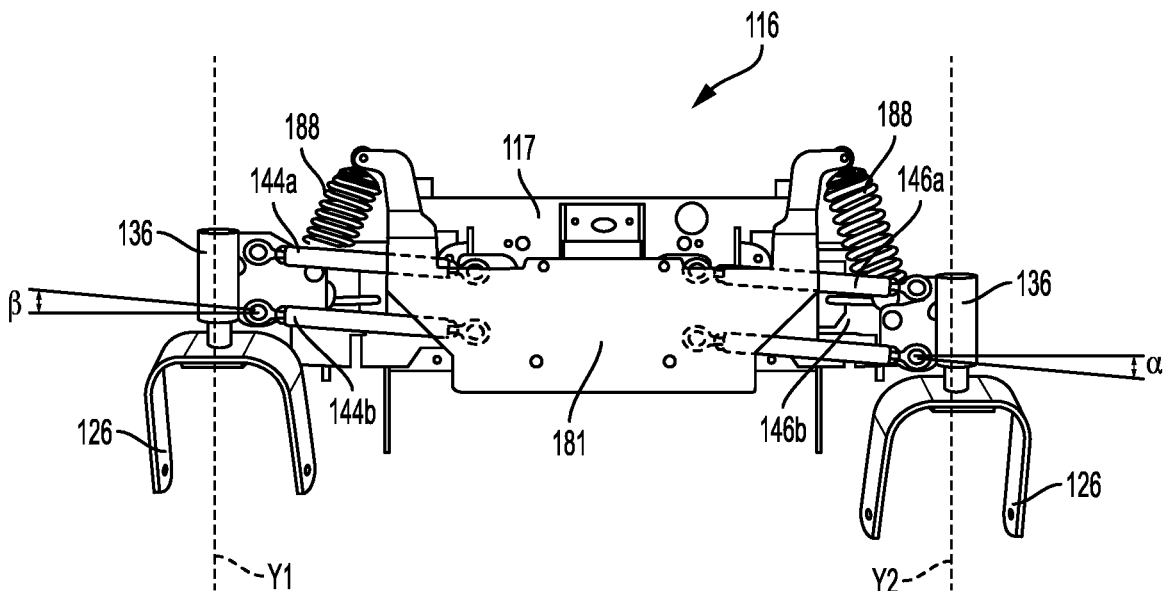
FIG. 7D illustrates the front wheel independent suspension assembly of FIG. 7A in a fourth configuration.

As front independent suspension assembly 116 allows for independent movement of suspension arms 144a, 144b (and their coupled wheel assembly) relative to suspension arms 146a, 146b, and vice versa, it is to be understood that each respective front wheel assembly is capable of independent vertical movement based on varying terrain, obstacles, loading, etc. For example, as shown in FIG. 7C, suspension arms 144a, 144b may remain biased at angle α (i.e., in an unloaded state), while suspension arms 146a, 146b are forced to an angle β. Conversely, referring to FIG. 7D, suspension arms 144a, 144b may be forced to an angle R, while suspension arms 146a, 146b may remain at an angle α relative to horizontal. In either configuration, each joint 136 remains in-line with a respective vertical axis Y1, Y2, thereby preventing an angular cant of the wheels so as to maintain good ground contact, provide for relatively even tire wear, etc. Furthermore, while angle α (unloaded) and angle β (fully-loaded) are described herein, it is to be understood that suspension arms 144a, 144b, 146a, 146b may be displaced at any angle between angle α and angle β during operation.

Additionally, referring still to FIGS. 7A-7D, front independent suspension assembly 116 is shown with a front plate 181 positioned to the front of at least a portion of suspension arms 144a, 144b, 146a, 146b at a location in which suspension arms 144a, 144b, 146a, 146b are pivotally coupled to front beam 117. In this way, front plate 181 is configured to provide protection to at least some portions of suspension arms 144a, 144b, 146a, 146b and/or their mounting locations, which may prevent suspension arms 144a, 144b, 146a, 146b from becoming bent or otherwise damaged due to a frontal impact. However, it is to be understood that front plate 181 may be configured as being removable, thereby providing user access to the suspension arms 144a, 144b, 146a, 146b and/or their mounting locations for adjustment, replacement, or repair. Furthermore, front plate 181 may be removed altogether, dependent upon user and/or manufacturer preferences.

Figure 8:
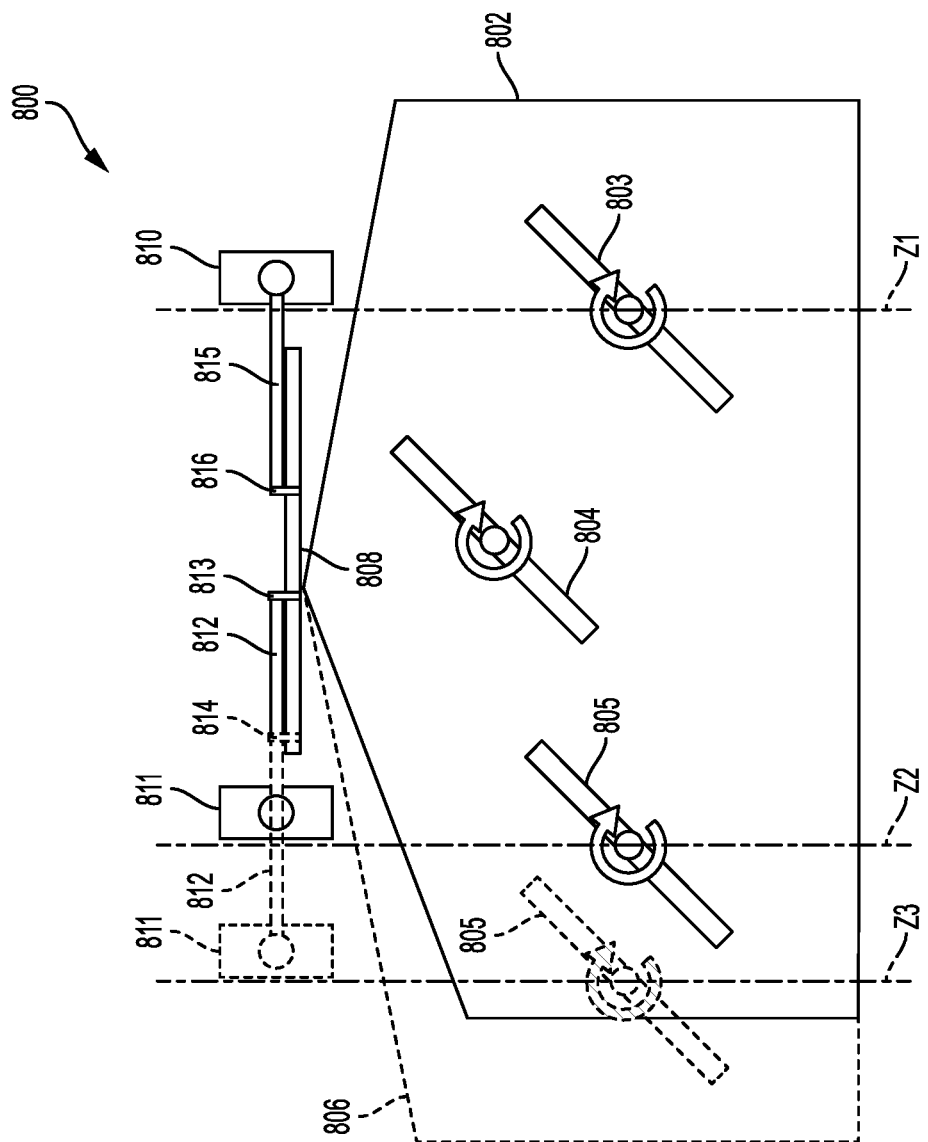
FIG. 8 illustrates a top down view of a cutter deck and front wheel independent suspension assembly arrangement in accordance with another aspect of the disclosure.

Next, referring to FIG. 8, a schematic top view of a cutter deck and front independent suspension arrangement 800 in accordance with another aspect of the disclosure is illustrated. It is to be understood that the components of cutter deck and front independent suspension arrangement 800 (and their specific positions) are not to drawn to scale. While not shown, it is to be understood that cutter deck and front independent suspension arrangement 800 may be utilized with a mower such as mower 100 and/or mower 700 described above. FIG. 8 illustrates two separate cutter decks—first cutter deck 802 (shown in solid lines) and second cutter deck 806 (shown partially in phantom). First cutter deck 802 may be a 3-blade, suspended deck having a first width (e.g., 52 inches), while second cutter deck 806 may be a 3-blade, suspended deck having a second, larger width (e.g., 60 inches). As each of decks 802, 806 is configured to be suspended from a mower frame (not shown), decks 802, 806 may be interchangeable dependent upon manufacturer and/or user preferences, footprint limitations, etc.

Decks 802, 806 include three separate rotary mower blades—a first blade 803, a second blade 804, and a third blade 805, with third blade 805 being positioned farthest from a side discharge opening of cutter decks 802, 806. As is shown, the position of third blade 805 differs dependent upon the size of the cutter deck, with the blade 805 (shown in solid) positioned nearer a centerline of the first cutter deck 802 than blade 805 (shown in phantom) of the second cutter deck 806. While not shown, it is to be understood that the positioning of first blade 803 and the second blade 804 may also differ dependent upon deck size. Furthermore, the length of each blade 803, 804, 805 may also vary dependent upon deck size.

Referring still to FIG. 8, cutter deck and front independent suspension arrangement 800 also includes a front beam 808 upon which a pair of front wheel assemblies 810, 811 are pivotally mounted. Specifically, first front wheel assembly 810 is pivotally coupled about a first mounting location 816 via a first suspension arm pair 815, while second front wheel assembly 811 is pivotally coupled about a second mounting location 813 via a second suspension arm pair 812. In some embodiments, both first front wheel assembly 810 and second front wheel assembly 811 are configured to include caster wheels capable of 360° of rotation about a respective joint. While not illustrated in the top-down view of FIG. 8, it is to be understood that first suspension arm pair 815 and second suspension arm pair 812 each may include two separate suspension arms arranged in a 4-bar-linkage-type configuration, with each suspension arm pair being operably coupled to a suspension device (e.g., a shock, spring, elastomer, etc.) similar to that which is shown and described above with respect to FIGS. 1-6. Accordingly, first suspension arm pair 815 and second suspension arm pair 812 provide for an independent suspension arrangement for the respective first front wheel assembly 810 and second front wheel assembly 811.

As noted above, first front wheel assembly 810 is pivotally coupled about a first mounting location 816 of front beam 808 via a first suspension arm pair 815, while second front wheel assembly 811 is pivotally coupled about a second mounting location 813 of front beam 808 via a second suspension arm pair 812. The respective first and second mounting locations 816, 813 may include any suitable form of pivotable connection such as, e.g., a spherical ball joint, a pivot and aperture connection, a hinge connection, etc. Accordingly, each suspension arm pair 815, 812 is capable of at least two-dimensional, vertical movement relative to front beam 808, with the angle of movement possible being dependent, at least in part, upon a coupled suspension device such as shock absorbers 302 and/or suspension springs 188 described above.

Based on the length of first suspension arm pair 815 and second suspension arm pair 812 and/or their respective mounting locations upon front beam 808, first front wheel assembly 810 and second front wheel assembly 811 are positioned ahead of the cutter decks 802, 803 with respect to one another at a particular width. In accordance with an embodiment of the disclosure, the positions at which first front wheel assembly 810 and second front wheel assembly 811 are mounted is chosen specifically based on the centerline positions of first blade 803 and third blade 805. That is, when cutter deck 802 is being utilized, first front wheel assembly 810 is positioned slightly offset from a transverse axis Z1 of first blade 803. Similarly, second front wheel assembly 811 is positioned slightly offset from a transverse axis Z2 of third blade 805. Due to these slightly offset positions of first front wheel assembly 810 and second front wheel assembly 811, grass or other vegetation that may be compacted by the tires of each wheel assembly during travel may be subsequently lifted (via suction) and cut by the respective blades 803, 805 as the cutter deck 802 passes over the same grass or vegetation. It is known that the suction/lift effects provided by rotating blades 803, 805 is least at the point directly in line with the axis of rotation of blades 803, 805. Thus, if first front wheel assembly 810 and second front wheel assembly 811 were to be positioned directly in-line with respective transverse axes Z1, Z2 of blades 803, 805, the suction/lift of grass compacted by the tires of first front wheel assembly 810 and second front wheel assembly 811 may be insufficient, thereby leading to an uneven cut and/or "stripes" of taller grass or vegetation at locations where first front wheel assembly 810 and second front wheel assembly 811 travel across the terrain to be mowed. Similarly, if the first front wheel assembly 810 and second front wheel assembly 811 were to be positioned far from the respective transverse axes Z1, Z2 (i.e., offset to a position in-line with an end portion of the respective blades), the suction/lift of grass compacted by the tires at these positions may also be insufficient.

In order to position first front wheel assembly 810 and second front wheel assembly 811 in a desired offset position relative to respective blades 803, 805, the mounting locations on front beam 808 and/or the length of first suspension arm pair 815 and second suspension arm pair 812 must be considered. Front beam 808 may be configured so as to include numerous possible mounting locations thereon, with the first suspension arm pair 815 and second suspension arm pair 812 capable of being pivotally mounted at any such location based on, e.g., cutter deck size. For example, when cutter deck 802 is utilized, respective mounting locations 816, 813 may be chosen for mounting the first pivoting ends of first suspension arm pair 815 and second suspension arm pair 812. With these mounting locations and the given lengths of first suspension arm pair 815 and second suspension arm pair 812, the first front wheel assembly 810 and second front wheel assembly 811 are positioned in a desired offset position relative to the transverse axes Z1, Z2 of respective blades 803, 805.

However, as noted above, a wider cutter deck (e.g., cutter deck 806) may be utilized in some mower configurations. In such configurations, where at least the third blade 805 (shown in phantom) of cutter deck 806 changes lateral location relative to the third blade 805 (shown in solid lines) of cutter deck 802, the placement of at least the second front wheel assembly 811 would not be slightly offset from a transverse axis Z3 of third blade 805 if second suspension arm pair 802 is still pivotally coupled to front plate 808 at mounting location 813, thereby potentially leading to an uneven cut and/or "stripes" of taller grass or vegetation where second front wheel assembly 811 has travelled. Accordingly, the mounting location of second suspension arm pair 812 can be changed so as to provide a suitable offset with the transverse axis Z3 of third blade 805 of cutter deck 806. Specifically, as shown in FIG. 8, a mounting locations 814 on front plate 808 may be chosen, which allows for second suspension arm pair 812 to be pivotally mounted such that second front wheel assembly 811 is only slightly offset from transverse axis Z3 at a desired position. In this way, only the mounting location(s) on the front plate 808 of the suspension arm pair(s) need be adjusted to account for changes in cutter deck width, allowing the changes to be made without significant alterations to the design of the front independent suspension configuration.

Additionally and/or alternatively, the lengths of one or both of first suspension arm pair 815 and second suspension arm pair 812 may be extended or shortened so as to account for different cutter deck widths. That is, instead of (or in addition to) altering mounting locations upon front plate 808, the lengths of one or both of first suspension arm pair 815 and second suspension arm pair 812 may be extended or shortened so as to properly align the respective first front wheel assembly 810 and second front wheel assembly 811 with the transverse axes of first blade 803 and third blade 805, respectively.

While FIG. 8 illustrates that cutter decks 802, 805 are 3-blade decks, it is to be understood that more or fewer mower blades may be utilized. Furthermore, while first suspension arm pair 815 and second suspension arm pair 812 are described above as being configured in a 4-bar-linkage-arrangement, it is to be understood that other linkage arrangements coupling front plate 808 to the respective wheel assemblies are possible, including, e.g., single-bar linkages.

Figure 9:
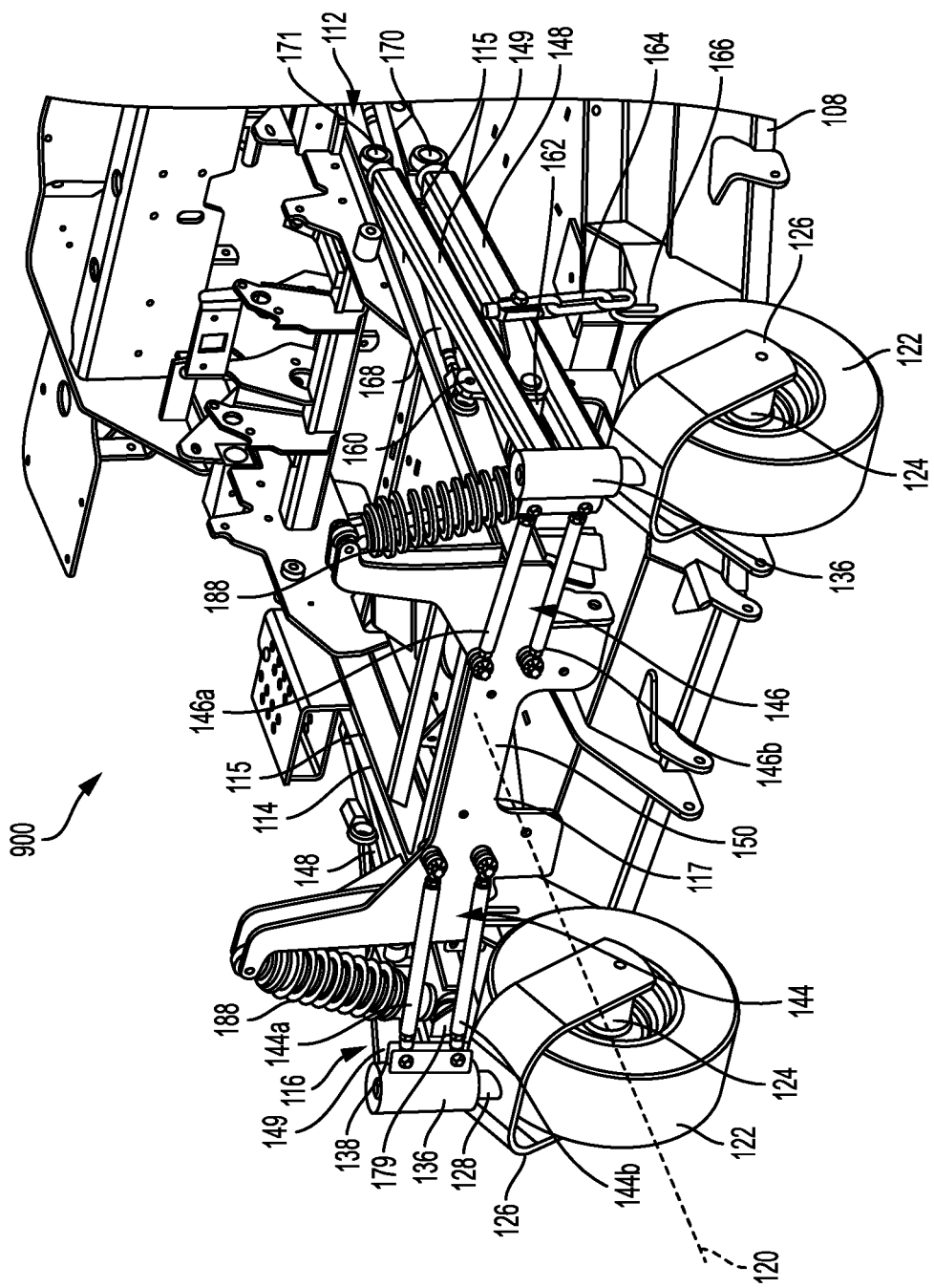
FIG. 9 illustrates a front perspective view of a portion of a ride-on mower including a 4-bar linkage front suspension arrangement in accordance with another aspect of the disclosure.

Next, referring to FIG. 9, a mower 900 in accordance with another aspect of the disclosure is shown. Numerous components of cutter deck 900 are the same or similar as those shown and described above with respect to mower 100. Accordingly, to avoid repetitive disclosure and for the purpose of clarity, like reference numerals of like components between mower 100 and mower 900 are utilized in FIG. 9.

As shown in FIG. 9, mower 900 includes the first suspension arm pair 144 and the second suspension arm pair 146 configured in a 4-bar-linkage-type arrangement such that respective wheel assemblies 122 (and joints 136) travel in continuous vertical alignment, regardless of the angular position of the suspension arm pairs 144, 146. However, while mower 100 discloses a pair of longitudinally-extending suspension side arms 148 pivotally coupled to opposite sides of the front frame 114 by respective side pivot assemblies 170, mower 900 includes a pair of longitudinally-extending second side suspension arms 149 positioned substantially parallel to side suspension arms 148 so as to provide a 4-bar-linkage-type arrangement between not only the first and second suspension arm pairs, but also the respective side suspension arms. More specifically, second side suspension arms 149 are pivotally coupled at a first end to a portion of the front frame 144 about a second side pivot assembly 171, and are each pivotally coupled at or near a respective joint 136 of a wheel assembly 122 at a second end. In this way, substantially parallel side suspension arms 148, 149 provide for increased support of the respective wheel assemblies 122 in the longitudinal direction, while still providing the advantages of vertical alignment of the wheel assemblies 122 during suspended movement via the 4-bar-linkage-type arrangement. The positioning of the respective side pivot assemblies 170, 171 on the front frame 114 may vary dependent upon, e.g., available space, structural support, desired length of the side suspension arms, etc.

While the front-wheel suspension assemblies described above are presented in the context of use with mowers and, specifically, ride-on zero turn radius lawnmowers. It is to be understood that the 4-bar-linkage-type arrangements described herein may be utilized with other forms of outdoor power equipment, including other ride-on, stand-on, or walk-behind forms of outdoor power equipment. For example, the various embodiments disclosed herein may be utilized with stand-on mowers, walk-behind mowers, stand-on, walk-behind, or ride-on blowers, stand-on, walk-behind, or ride-on spreaders, stand-on, walk-behind, or ride-on sprayers, stand-on, walk-behind, or ride-on aerators, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A front independent suspension assembly for outdoor power equipment, the front independent suspension assembly comprising:
   a first joint;
   a first caster wheel coupled to the first joint, wherein the first joint is arranged above the first caster wheel;
   a first longitudinal arm pivotably coupled to the first joint;
   a first lateral arm pivotably coupled to the first joint; and
   a second lateral arm pivotably coupled to the first joint, wherein the second lateral arm is arranged substantially parallel to the first lateral arm, and wherein the pivotal coupling between the first joint and each of the first longitudinal arm, the first lateral arm, and the second lateral arm enables the first caster wheel to independently displace about a vertical axis.

2. The front independent suspension assembly of claim 1, wherein the first longitudinal arm includes a pivot assembly at a first end and is fixedly coupled at a second opposite end to the first joint.

3. The front independent suspension assembly of claim 1, further comprising a second longitudinal arm pivotably coupled to the first joint.

4. The front independent suspension assembly of claim 3, wherein the second longitudinal arm is substantially parallel to the first longitudinal arm.

5. The front independent suspension assembly of claim 1, further comprising a first shock absorber configured to absorb shock transmitted from the first caster wheel.

6. The front independent suspension assembly of claim 5, wherein the first shock absorber includes a spring.

7. The front independent suspension assembly of claim 5, wherein the first shock absorber is pivotably coupled between the first caster wheel and a front frame.

8. The front independent suspension assembly of claim 1, wherein a first end of both the first lateral arm and the second lateral arm is pivotably coupled to a front frame and a second opposite end is pivotably coupled to the first joint.

9. The front independent suspension assembly of claim 1, further comprising:
   a second joint;
   a second caster wheel coupled to the second joint;
   a third lateral arm pivotably coupled to the second joint; and
   a fourth lateral arm pivotably coupled to the second joint, wherein the third lateral arm is substantially parallel to the fourth lateral arm.

10. A front independent suspension assembly for outdoor power equipment, the front independent suspension assembly comprising:
    a first caster wheel assembly including a first caster wheel and a first joint arranged above the first caster wheel;
    a first longitudinal arm pivotably coupled to the first joint;
    a first lateral arm pivotably coupled to the first joint; and
    a second lateral arm pivotably coupled to the first joint, wherein the pivotal coupling between the first joint and each of the first longitudinal arm, the first lateral arm, and the second lateral arm enables the first caster wheel assembly to independently displace about a vertical axis.

11. The front independent suspension assembly of claim 10, wherein the first longitudinal arm includes a pivot assembly at a first end and is fixedly coupled at a second opposite end to the first caster wheel assembly.

12. The front independent suspension assembly of claim 10, further comprising a second longitudinal arm pivotably coupled to the first caster wheel assembly.

13. The front independent suspension assembly of claim 12, wherein the second longitudinal arm is substantially parallel to the first longitudinal arm.

14. The front independent suspension assembly of claim 10, further comprising a first shock absorber configured to absorb shock transmitted from the first caster wheel assembly.

15. The front independent suspension assembly of claim 14, wherein the first shock absorber includes a spring.

16. A lawn mower, comprising:
    a cutting deck;
    a first caster wheel assembly including a first caster wheel and a first joint arranged above the first caster wheel; and
    a front independent suspension assembly including:
      a first longitudinal arm pivotably coupled to the first joint;
      a first lateral arm pivotably coupled to the first joint; and
      a second lateral arm pivotably coupled to the first joint, wherein the pivotal coupling between the first joint and each of the first longitudinal arm, the first lateral arm, and the second lateral arm enables the first caster wheel assembly to independently displace about a vertical axis.

17. The lawn mower of claim 16, wherein the first longitudinal arm includes a pivot assembly at a first end and is fixedly coupled at a second opposite end to the first caster wheel assembly.

18. The lawn mower of claim 16, further comprising a second longitudinal arm pivotably coupled to the first caster wheel assembly.

19. The lawn mower of claim 18, wherein the second longitudinal arm is substantially parallel to the first longitudinal arm.

20. The lawn mower of claim 16, further comprising a first shock absorber configured to absorb shock transmitted from the first caster wheel assembly.

* * * * *